(12) United States Patent
Waldern

(10) Patent No.: US 11,852,588 B2
(45) Date of Patent: Dec. 26, 2023

(54) SURFACE-ENHANCED RAMAN SCATTERING BIOSENSOR

(71) Applicant: Jonathan David Waldern, Diablo, CA (US)

(72) Inventor: Jonathan David Waldern, Diablo, CA (US)

(*) Notice: Subject to any disclaimer, the term of this patent is extended or adjusted under 35 U.S.C. 154(b) by 0 days.

(21) Appl. No.: 17/983,136

(22) Filed: Nov. 8, 2022

(65) Prior Publication Data

US 2023/0221258 A1 Jul. 13, 2023

Related U.S. Application Data

(63) Continuation of application No. 17/500,700, filed on Oct. 13, 2021, now Pat. No. 11,513,077.

(60) Provisional application No. 63/151,650, filed on Feb. 20, 2021, provisional application No. 63/126,075, filed on Dec. 16, 2020, provisional application No. 63/112,672, filed on Nov. 12, 2020, provisional application No. 63/112,674, filed on Nov. 12, 2020, provisional application No. 63/092,212, filed on Oct. 15, 2020, provisional application No. 63/090,917, filed on Oct. 13, 2020.

(51) Int. Cl.
| | | |
|---|---|---|
| *G01J 3/44* | (2006.01) | |
| *G01N 21/65* | (2006.01) | |
| *G02B 1/00* | (2006.01) | |

(52) U.S. Cl.
CPC .............. *G01N 21/658* (2013.01); *G01J 3/44* (2013.01); *G02B 1/005* (2013.01)

(58) Field of Classification Search
CPC ................................ G01J 3/44; G01N 21/658
See application file for complete search history.

(56) References Cited

U.S. PATENT DOCUMENTS

| | | | | |
|---|---|---|---|---|
| 2012/0309080 A1* | 12/2012 | Cunningham | ....... | G01N 21/658 |
| | | | | 977/782 |
| 2015/0276477 A1* | 10/2015 | Volodin | ................ | G01J 3/4412 |
| | | | | 356/301 |

* cited by examiner

*Primary Examiner* — Maurice C Smith
(74) *Attorney, Agent, or Firm* — Rene A. Vazquez, Esq.

(57) ABSTRACT

A general purpose sensor architecture integrating a surface enhanced Raman spectroscopy (SERS) substrate, a diffractive laser beam delivery substrate and a diffractive infrared detection substrate is provided that can be used to implement a low-cost, compact lab-on-a-chip biosensor that can meet the needs of large-scale infectious disease testing. The sensor architecture can also be used in any other application in which molecules present in the liquid, gaseous or solid phases need to be characterized reliably, cost-effectively and with minimal intervention by highly skilled personnel.

20 Claims, 26 Drawing Sheets

SURFACE-ENHANCED RAMAN SCATTERING BIOSENSOR

This application is a continuation of U.S. patent application Ser. No. 17/500,700, filed on Oct. 13, 2021, which claims priority to the following U.S. Provisional Applications: Ser. No. 63/090,917, filed Oct. 13, 2020; Ser. No. 63/092,212, filed Oct. 15, 2020; Ser. No. 63/112,672, filed Nov. 12, 2020; Ser. No. 63/112,674, filed Nov. 12, 2020; Ser. No. 63/126,075, filed Dec. 16, 2020; and Ser. No. 63/151,650, filed Feb. 20, 2021. The entire disclosures of the aforementioned applications are incorporated herein by reference.

BACKGROUND OF THE INVENTION

Field of the Invention

The present invention relates generally to optical sensors and, more particularly, to a holographic waveguide sensor for molecular detection.

Background of the Related Art

There is a growing need for cheap portable biosensors in medicine, pharmaceuticals, food processing and other applications. The COVID-19 pandemic has accelerated the search for effective and cheap solutions for mass testing for infectious diseases. What is needed is accurate testing that can be performed quickly and efficiently with minimal risk of false readings by ordinary healthcare workers. The tests could be delivered on the doorstep or in a large batch processing setting targeting a throughput of around 10,000 samples per day.

A major limitation of current test equipment is that many processing steps are needed to convert the material captured by an initial nose or throat swab sample into a material that can be analyzed using a standard instrument. For example, steps are usually required for converting RNA molecules to complementary DNA, a similar molecular which can be handled more easily. The process can typically involve sample purification, making reaction mixtures and adding RNA templates. Heating steps to amplify the viral RNA are also required.

A spectrophotometric sensor is required for reading the fluorescence generated by the amplified RNA (amplicons). One lab-based RNA testing technique, Reverse-Transcription Polymerase Chain Reaction (RT-PCR), which is widely used in fields such as genetics, can detect whether viral RNA is present by capturing and amplifying regions of the virus' genetic material. The viral RNA is converted to DNA, copied many times until enough material is available for detection. The material is subjected to repeated temperature cycles then detected with the aid of fluorescent markers. Processing of the sample typically takes from 3-4 hours.

Another technique for viral RNA testing, Recombinase Polymerase Amplification (RPA), is as specific as PCR amplification, but is much faster and does not require thermal processing. Once initiated, the amplification reaction progresses rapidly, so that starting with just a few target copies of DNA, the highly specific DNA amplification reaches detectable levels within minutes.

Loop-Mediated Isothermal Amplification (LAMP) eliminates temperature cycle and is fast, stable, sensitive, more specific for DNA identification and can be integrated with microfluidics. LAMP-based approaches produce approx. 50-fold more amplicons than PCR-based methods. Importantly, LAMP can amplify NA in complex substrates even in the presence of contaminants. However, the LAMP technique is less mature than PCR.

In general, current gold standard equipment is very expensive, costing many thousands of dollars, and is too bulky to be brought to the patient. These disadvantages make current equipment unsuitable for deployment in GP surgeries, pharmacies or care homes or for the large-scale testing demanded by the current COVID-19 outbreak.

SUMMARY OF THE INVENTION

An object of the invention is to solve at least the above problems and/or disadvantages and to provide at least the advantages described hereinafter.

Therefore, an object of the present invention is to provide a general purpose sensor architecture integrating a surface enhanced Raman spectroscopy (SERS) substrate, a diffractive laser beam delivery substrate and a diffractive infrared detection substrate.

Another object of the present invention is to provide processes for large volume fabrication of SERS substrates.

Another object of the present invention is to provide diffracting structures for integrating SERS laser irradiation and Raman scatter collection, including orthogonal grating structures.

Another object of the present invention is to provide diffracting structures for long wavelength electromagnetic radiation collection and detector coupling.

Another object of the present invention is to provide diffracting structures incorporating antennas and other components for electromagnetic communications.

Another object of the present invention is to provide a grating structures and fabrication processes for pixel arrays and associated electronic signal and control circuity for use in high density liquid crystals displays.

Another object of the present invention is to provide laser beam directing optical structures using switching gratings for SERS activation.

Another object of the present invention is to provide diffracting structures incorporating features for optimizing plasmon field characteristics in SERS devices.

Another object of the present invention is to provide SERS substrates incorporating liquid crystal layers.

Another object of the present invention is to provide SERS substrates incorporating nanostructures.

Another object of the present invention is to provide SERS substrates incorporating reporter molecules.

Another object of the present invention is to provide SERS substrates incorporating phase-separated diffractive structures.

Another object of the present invention is to provide SERS substrates incorporating metallized diffractive structures.

Another object of the present invention is to provide SERS substrates incorporating hybrid diffractive structures.

Another object of the present invention is to provide reconfigurable diffractive antennas for wireless communications, imaging and sensing applications.

Another object of the present invention is to provide a sensor architecture for detecting COVID-19 from saliva.

Another object of the present invention is to provide grating structures and grating structure fabrication processes for millimeter waves.

To achieve at least the above objects, in whole or in part, there is provided a biosensor, comprising a pump laser source that emits pump light having at least one wavelength, a surface enhanced Raman spectroscopy (SERS) substrate, an analyte layer comprising at least one type of molecule disposed on said SERS substrate, each of said at least one type of molecule exhibiting a unique Raman spectrum under irradiation from said light at said at least one wavelength, a pump laser substrate comprising at least one pump laser channel for propagating pump laser beams, a pump beam switch for directing a portion of the pump light from said pump laser source into each of said pump laser channels sequentially, a coupling layer overlaying each of said at least one pump laser channel for directing the pump light portion propagating in each channel towards said SERS substrate, a Raman signal detection substrate comprising at least one Raman signal detection channel supporting a surface relief structure for capturing a Raman signal and guiding said Raman signal, a detector with a detection bandwidth covering a Raman spectra of said molecules, and a Raman signal beam combiner for coupling each of said at least one Raman signal detection channel to said detector.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
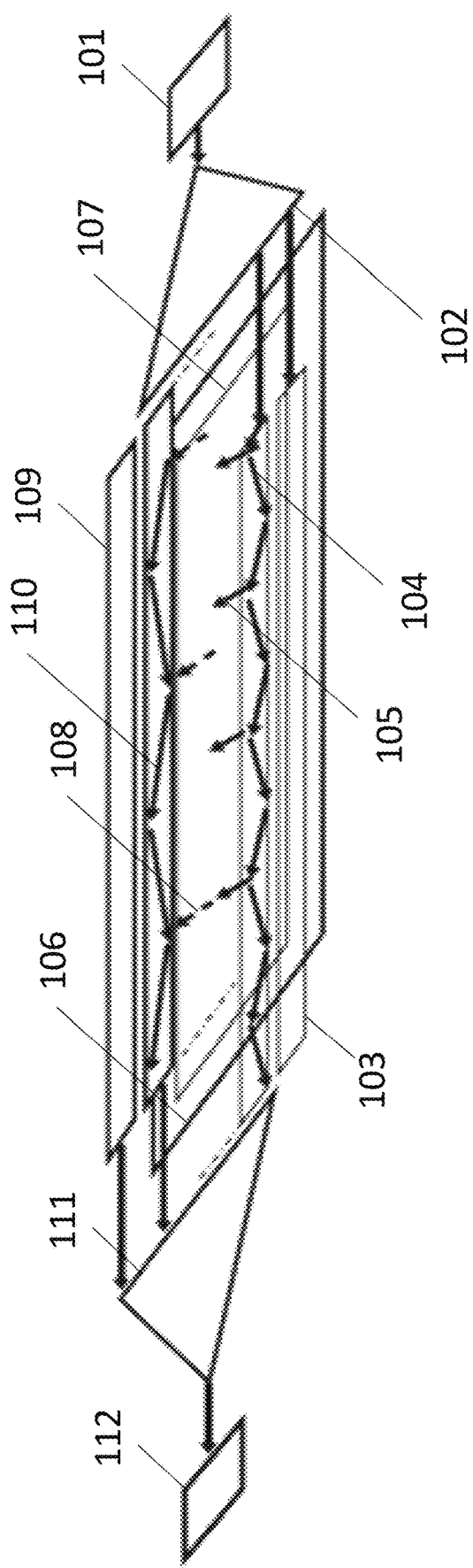
FIG. 1 is a perspective view of a waveguide biosensor, in accordance with an embodiment of the present invention.

The following description is provided to enable a person of ordinary skill in the art to make and use the invention and sets forth the best modes contemplated by the inventor for carrying out the invention. Various modifications, however, will remain readily apparent to those skilled in the art, since the general principles of the present invention have been defined herein specifically to provide example embodiments.

For the purposes of explaining the present invention, well-known features of optical technology known to those skilled in the art of optical design and visual displays have been omitted or simplified in order to not obscure the basic principles of the invention. In the following description, the terms "light," "ray," "beam" and "direction" may be used interchangeably and in association with each other to indicate the direction of propagation of electromagnetic radiation along rectilinear trajectories. The terms "light" and "illumination" may be used in relation to the visible and infrared bands of the electromagnetic spectrum. Parts of the following description will be presented using terminology commonly employed by those skilled in the art of optical design. It should also be noted that in the following description of the invention, repeated usage of the phrases "in one embodiment" "an embodiment" does not necessarily refer to the same embodiment. As used herein, the term "grating" may encompass a grating comprised of a set of gratings in some embodiments.

It should be appreciated that various concepts and embodiments discussed herein may be implemented in any of numerous ways, as the disclosed concepts and embodiments are not limited to any particular manner of implementation. Examples of specific implementations and applications are provided primarily for illustrative purposes. A more complete understanding of the present invention can be obtained by considering the following detailed description in conjunction with the accompanying drawings, wherein like index numerals indicate like parts. For purposes of clarity, details relating to technical material that is known in the technical fields related to the invention have not been described in detail.

The prospect of miniaturizing biological test processes using the concept of a lab-on-a-chip has attracted interest from many quarters. Such devices can integrate many of the functions of sample acquisition, chemical processing and flow management and can support compact grating-based devices for performing spectrophotometric analysis. The most well-known examples of grating sensors are holograms that can change their color when illuminated by light scattered from molecular structures. Miniature grating spectrophotometers for carry out more sophisticated spectrophotometric assays are also widely used in many fields.

Gratings that can be chemically functionalized by means of dopants added to holographic film prior to exposure, within cladding layers overlaying the grating or onto surface relief gratings have also been widely reported. Many of the functions required for routing samples to on-chip processing nodes can be implemented as microfluidics systems.

Optical waveguides can provide a compact transparent device for implementing grating sensors. The versatility of gratings can be greatly enhanced by using switching gratings recorded in holographic polymer dispersed material systems. U.S. Pat. No. 5,937,115, entitled "Switchable Optical Components/Structures and Methods for the Fabrication Thereof," which is incorporated herein by reference its entirety, discloses a family of electro-optical components based on holographic polymer dispersed liquid crystal (HPDLC) gratings.

There is a need for a low cost, efficient, compact apparatus based on a grating waveguide for detecting molecular structures dispersed in a sample. Such an apparatus could be used to implement a low-cost, compact lab-on-a-chip biosensor that can meet the needs of large-scale infectious disease testing. Such a device could also have many other applications in which molecules present in the liquid, gaseous or solid phases need to be characterized reliably, cost-effectively and with minimal intervention by highly skilled personnel.

Outline of the Biosensor

Figure 2:
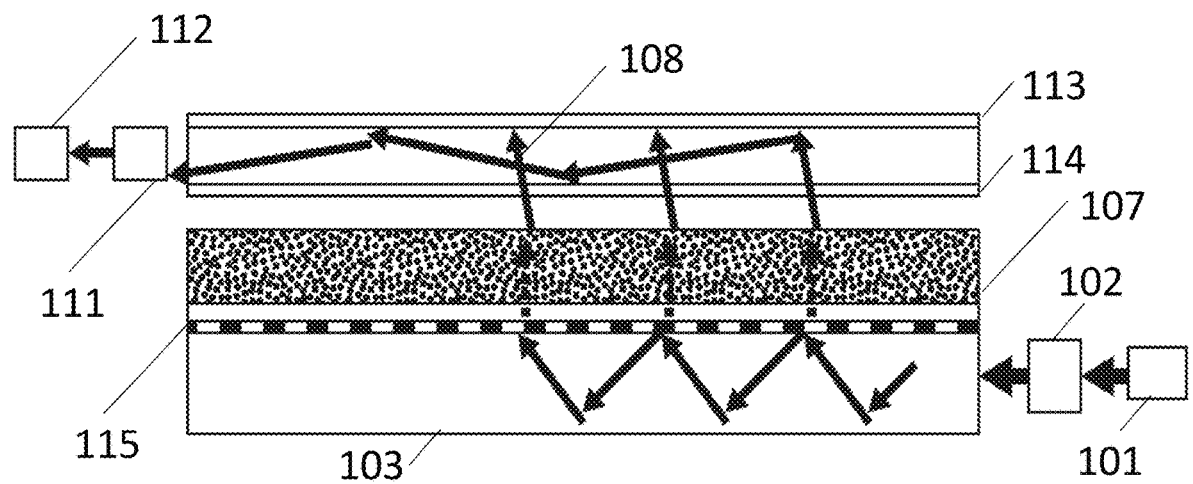
FIG. 2 is a side elevation view of a waveguide biosensor, in accordance with an embodiment of the present invention, in accordance with an embodiment of the present invention.
Figure 3:
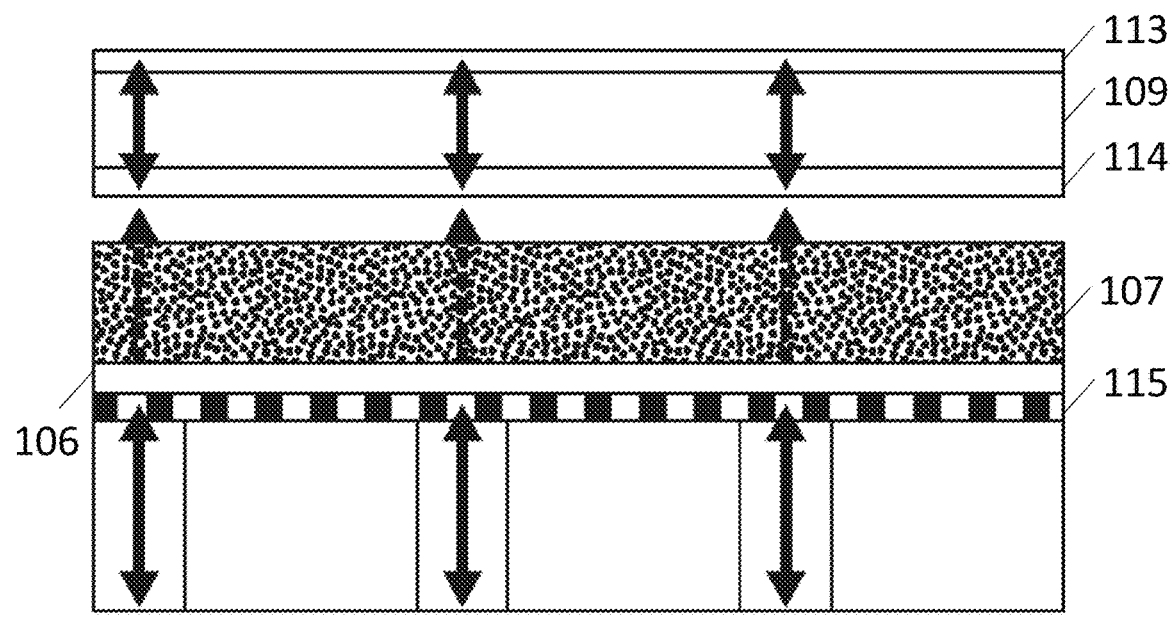
FIG. 3 is a cross-sectional view of the waveguide biosensor of FIG. 3.

An object of the invention is achieved in a first embodiment in which there is provided a biosensor for detecting at least one type of molecule dispersed in at least one sample. As shown in the perspective view of FIG. 1 and in the cross-sectional views and plan views of FIGS. 2-5, the apparatus comprises a detector (112), a laser source (101), and a laser beam switch (102) for sequentially directing the laser beam into a substrate supporting a multiplicity of pump laser channels (103). By switching the input beam between channels, the guided pump beams (104) in each pump beam channel can provide extracted portions (105) via a pump beam output grating (which is shown in the side and cross-sectional views of the biosensor in FIGS. 2-3) for illuminating a portion of a surface plasmon resonance substrate (106) overlapping the pump beam channel.

Figure 4:
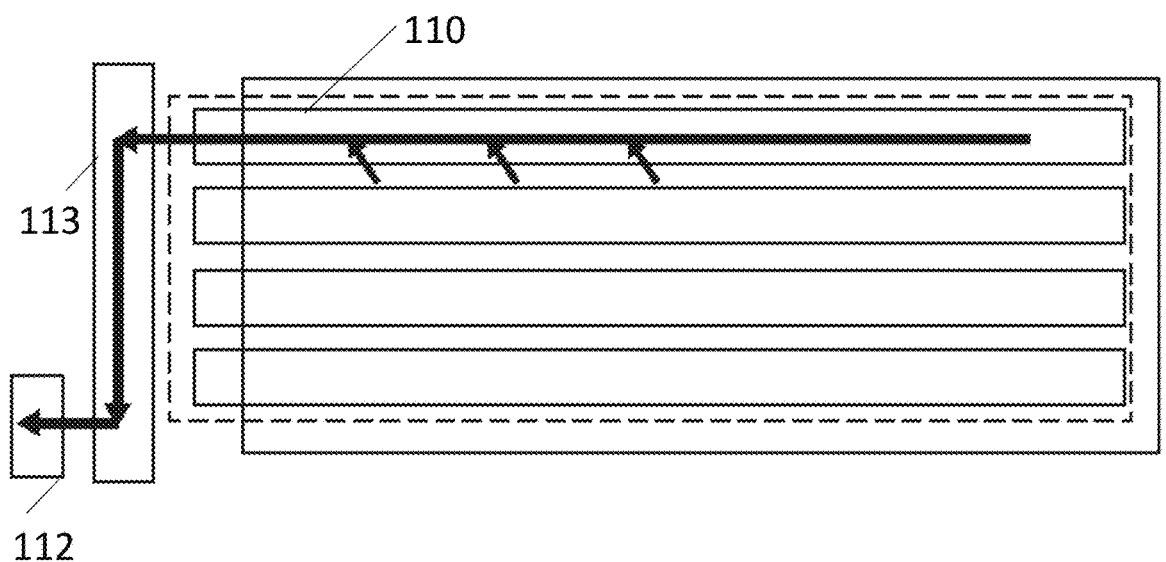
FIG. 4 is a first plan view of components of the waveguide biosensor of FIG. 2.
Figure 5:
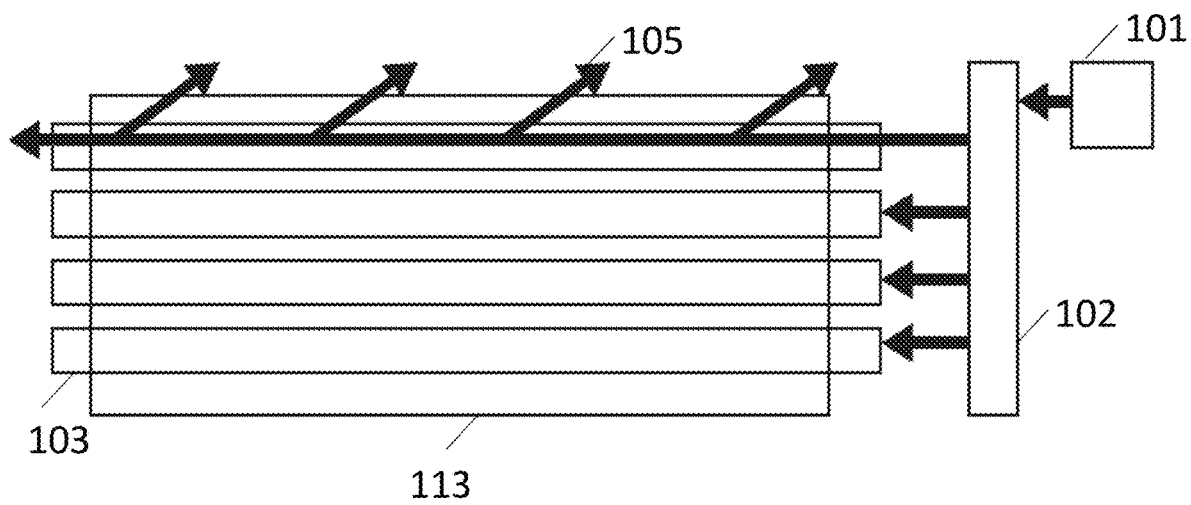
FIG. 5 is a second plan view of components of the waveguide biosensor of FIG. 2.

Disposed above the surface plasmon resonance substrate (106) is a layer of analyte (107) containing a multiplicity of molecules in a layer disposed between the surface plasmon resonance substrate (106) and the Raman signal channels. The Raman signal (108) scattered from the analyte after stimulation by the laser beam and amplification by the surface plasmon resonance substrate (106) can be coupled into a further substrate supporting a plurality of Raman signal channels (109), each sandwiched by reflectors (113 and 114). Each channel is operative to in-couple and convey the Raman scatter signal (110) from the analyte and, as shown in the following figures, further comprises an upper reflector (113) and a lower reflector (114) sandwiching each Raman signal channel (109), each Raman signal channel (109) overlapping a pump laser channel (103). Each Raman signal channel (109) supports optical structures for selectively coupling in predefined portions of the Raman spectrum emitted by the analyte (107). The required spectral selectivity can be provided by gratings formed in one or both of the upper and lower reflectors (113 and 114), the gratings having prescriptions optimized for high efficiency diffraction in said portions of the Raman spectrum. In some embodiments, optical filters can be used to filter portions of the Raman spectrum. The guided Raman signal in each channel is conveyed towards a beam combiner (111) for coupling to the detector (112). As will be discussed below, the above layers can be configured in several different ways, including combining the pump laser channel substrate and the Raman signal channel substrate into a single waveguiding structure. It should be apparent from FIG. 1 that a simple implementation of the present invention only requires one pump laser channel (103) and one Raman signal channel (109). FIGS. 4-5 show plan views of several of the above described elements of the biosensor.

The biosensor will now be described in more detail with reference to FIGS. 1-33, which illustrate various aspects of the biosensor, in accordance with many embodiments of the invention. Although, the following description will concentrate on the detection of Raman scatter, it should be apparent from the drawings and description that the invention can be implemented using a range of scattering phenomena, including resonant Raman scatter, non-resonant Raman scatter, Coherent Anti Stokes Raman Spectroscopy (CARS), Rayleigh scatter, Mie scattering and Brillouin scattering. It should also be apparent that, with suitable choice of source, detector and waveguide prescription, a biosensor based on the principles discussed herein can be configured for a range of sensing applications extending from the UV to radio wave bands.

Source

In some embodiments of the present invention, the source (101) emits at least one pump wavelength for stimulating Raman scatter in a molecule. The present invention is not limited to any specific emitter technology or operating wavelength. Many different types and configurations of light sources can be used while still falling within the scope of the present invention. Possible sources include, but are not limited to, a laser, a laser array, a plurality of laser die emitting at different wavelengths, a light emitting diode, a quantum dot, a broadband light source, and a broadband light source used in conjunction with a set of spectral bandpass filters for extract narrower wavelength bands. In some embodiments, the source may comprise one or more laser devices. Lasers offer the high wavelength specificity for molecular characterization. Lasers are also compatible with diffractive optical systems. In some embodiments, frequency tuneable lasers can be used. In some embodiments, laser arrays may be advantageous for providing parallel sample processing. In some embodiments, the laser can provide a pulsed output. In some embodiments where high wavelength specificity is not a key requirement, broadband sources such as a light emitting diode, organic light emitting diodes or tungsten halogen lamp can be used. In some embodiments, a broadband light source can be used in conjunction with a set of spectral bandpass filters for extracting narrower wavelength bands. In some embodiments, quantum dots, which have peak wavelength emission controlled by dot size, can be used to provide multiple wavelength sources. In some embodiments, the pump laser preferably emits in the near infrared at 780 nm. In some embodiments, the pump laser preferably emits in the ultraviolet at a wavelength less the 350 nm.

Detector

Many different types of detectors can be used in the present invention. In some embodiments, the detector (112) can be a single element device. In some embodiments, the detector (112) can be an array of photosensitive elements. In some embodiments, the detector (112) is preferably configured to operate over Raman signal spectral bandwidth. In some embodiments, the detector (112) preferably operates over the MWIR wavelength range. In some embodiments, a signal processor is preferably connected to the detector (112). In some embodiments, the Raman signal comprises an intensity variation across a wavelength band.

Pump Laser Channels

In some embodiments, a plurality of pump laser channels (103) can be supported by a substrate. In some embodiments, the substrate is a transparent optical material such as glass or an optical plastic. In some embodiments, the substrate supports a coupling grating for extracting light from the pump laser channels towards the surface plasmon resonance substrate. In some embodiments, the coupling grating can have a prescription for directing the wavevectors of the diffracted pump laser beams to satisfy Raman scatter momentum balance conditions withing the analyte and surface plasmon interaction region. In some embodiments, the pump laser channels (103) can be configured to interact with at least one layer for modify the pump laser beam polarization. In some embodiments, it is important to avoid leakage of light from one channel to another. In some embodiments, the pump laser channels (103) can be formed by core materials embedded within the substrate where the core refractive index is higher than the substrate refractive index. In some embodiments, the pump laser channels (103) can be formed as ridge structures disposed on a substrate surface.

Figure 17:
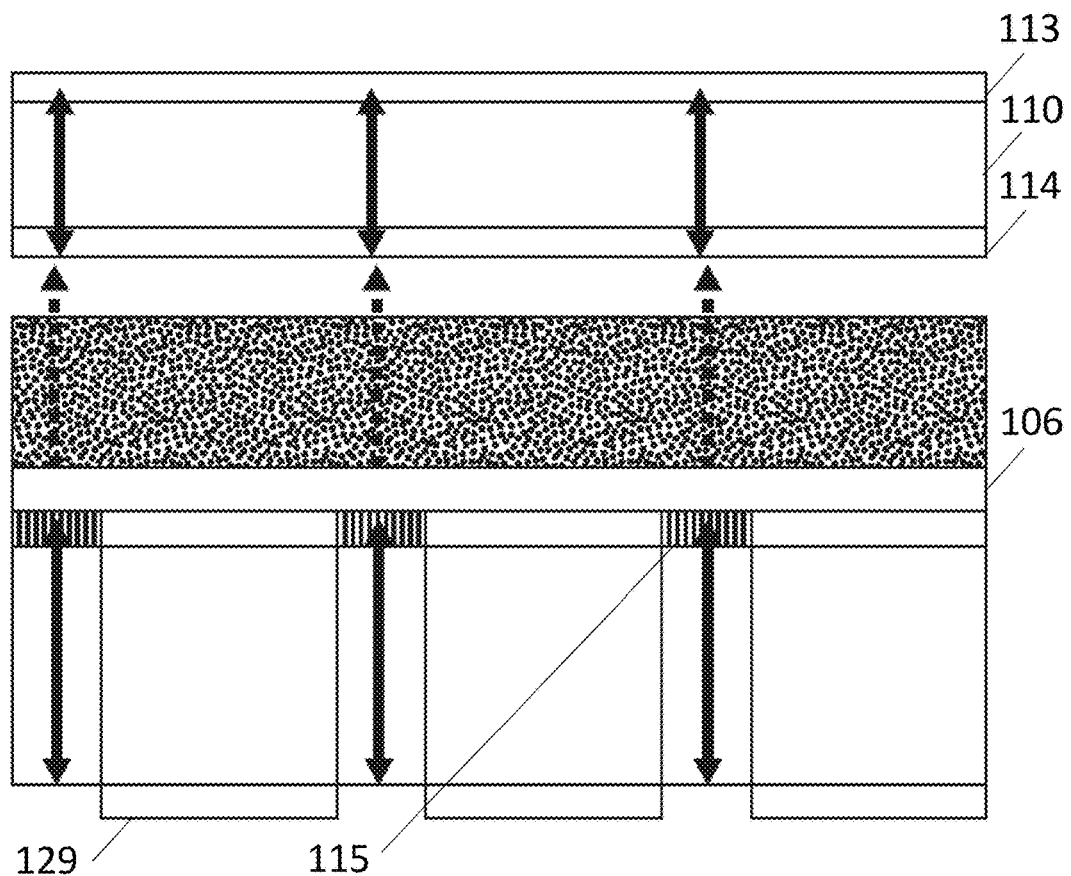
FIG. 17 is a cross-sectional view of a waveguide biosensor in which the pump laser channel array incorporates surfaces or coatings for inhibiting cross talk between adjacent channels, in accordance with an embodiment of the invention.
Figure 18:
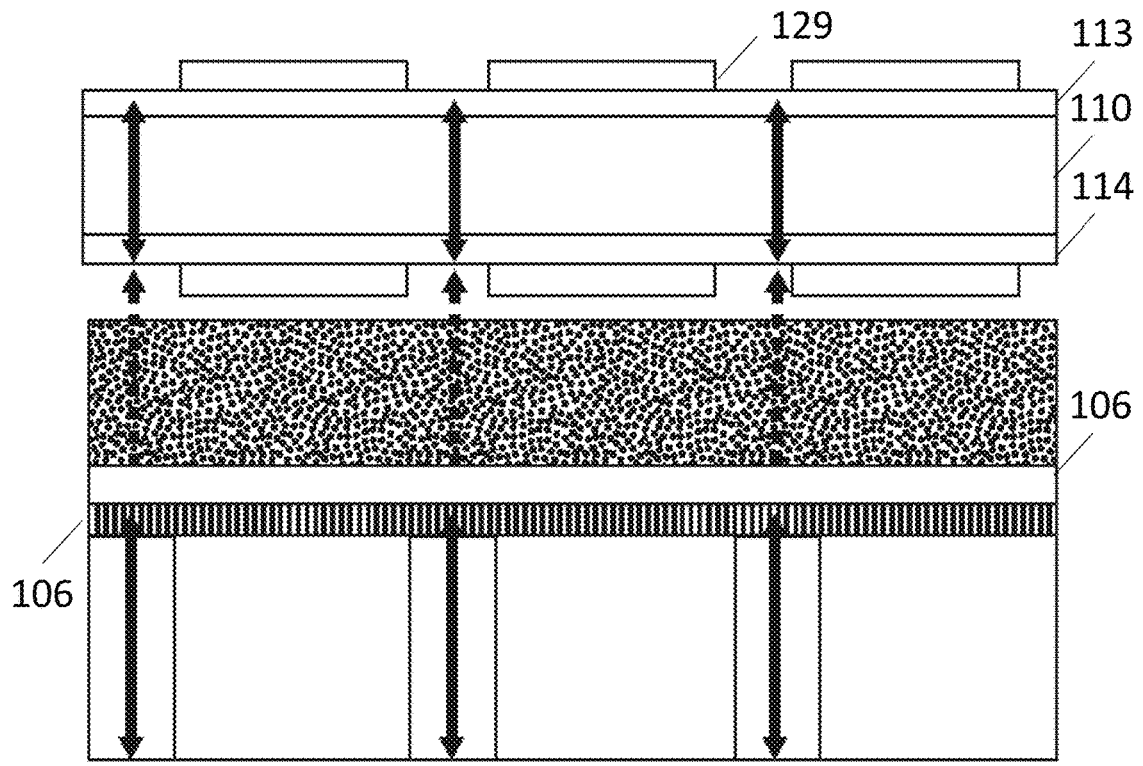
FIG. 18 is a cross-sectional view of a waveguide biosensor in which the Raman signal channel array incorporates surfaces or coatings for inhibiting cross talk between adjacent channels, in accordance with an embodiment of the invention.

In some embodiments, such as the one illustrated in FIGS. 17-18, the required confinement of the pump laser beams can be provided using coatings (129) designed to scatter, reflect or absorb light that might otherwise leak into an adjacent channel. The coatings (129) can be applied to substrate surface portions on either side of each channel. In some embodiments, coatings or surface etched features can be applied to the substrates surface portions overlapping each channel. The advantage of this technique is that the need for etching or diffusion of waveguide cores into the substrate can be avoided Raman signals typically exhibit forward and backward scattered intensity lobes. In some embodiments, a reflector can be disposed under the pump laser channel array substrate to reflect backward-scattered lobes of the Raman scatter distribution towards the Raman signal channel array. In some embodiments, a pump laser channel (103) can be provided by a solid or hollow light pipe having a continuous or polygonal cross-section. In some embodiments, a pump laser channel (103) can further comprise a light trap for capturing zero order diffracted light.

Switchable Beam Directing Module

Figure 6A:
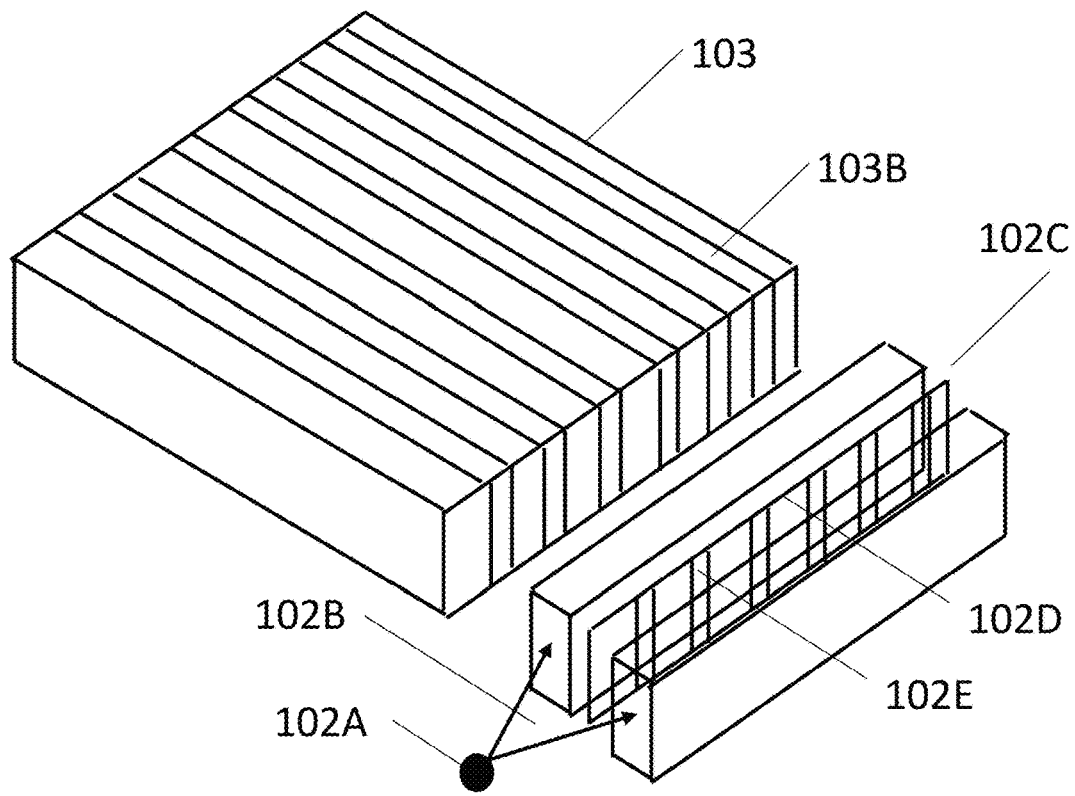
FIG. 6A is a perspective view of a pump laser channel array and a switchable grating waveguide pump beam switching module, in accordance with an embodiment of the invention.

In some embodiments, a switchable beam directing module (102) is used to direct light from the source (101) into TIR paths within each of the pump laser channels sequentially. The beam directing module (102) can be configured in many ways. In some embodiments, a plurality of laser beams can be sequentially generated using arrays of switchable gratings. One solution, illustrated in FIGS. 6A-6B, advantageously uses a waveguide containing switchable grating elements. FIG. 6A illustrates a portion of the pump laser channel array (103), in which each channel is sandwiched by isolation regions for avoiding crosstalk, and a pump laser beam switch (102) coupled to a pump laser source (101) emitting a pump laser beam (101A) which can be coupled into total internal reflection paths inside a waveguide structure (102A) comprising substrates sandwiching a switching grating layer (102B) into which are formed a linear array of switching grating elements (102C). In many embodiments, the apparatus can further comprise a beam stop (102D). Seven elements are illustrated. However, in some embodiments more elements or fewer elements can be used. Each grating element when switched from its passive state into its diffracting state diffracts light out of the waveguide structure into one of the pump laser channels (103).

Figure 6B:
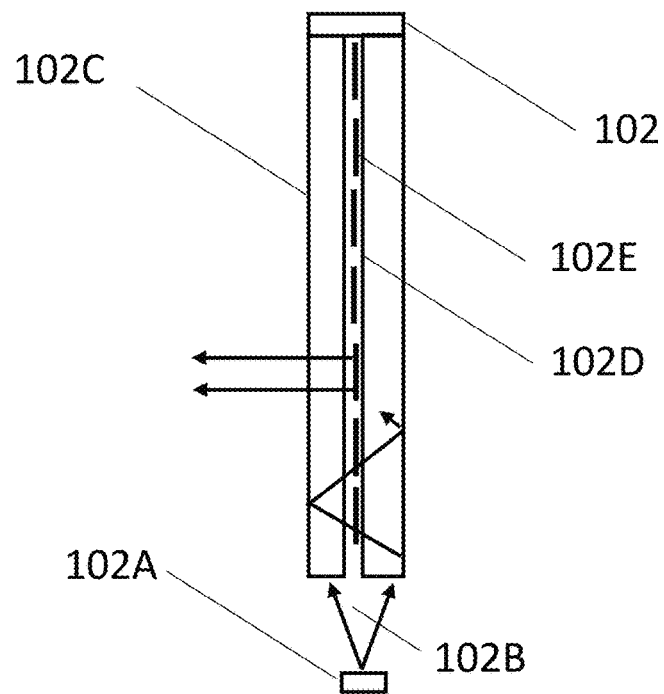
FIG. 6B is a plan view of a switchable grating waveguide pump beam switching module, in accordance with an embodiment of the invention.

FIG. 6B is a plan view of the waveguiding structure. Each grating element has a grating vector (or K-vector) for deflecting a laser beam undergoing total internal reflection within the waveguide out of the waveguide at 90 degrees to the waveguide surface. Each grating element in its diffracting state directs the laser beam into one of the pump laser channels (103). In some embodiments, the switchable gratings (102C) can be configured as transmission gratings. In some embodiments, the switchable gratings (102C) can operate as reflection gratings. Since the lasers for stimulating Raman scatter tend to emit in the visible to near infrared bands, the switchable gratings (102C) can be provided using polymer and liquid crystal material systems.

Figure 15:
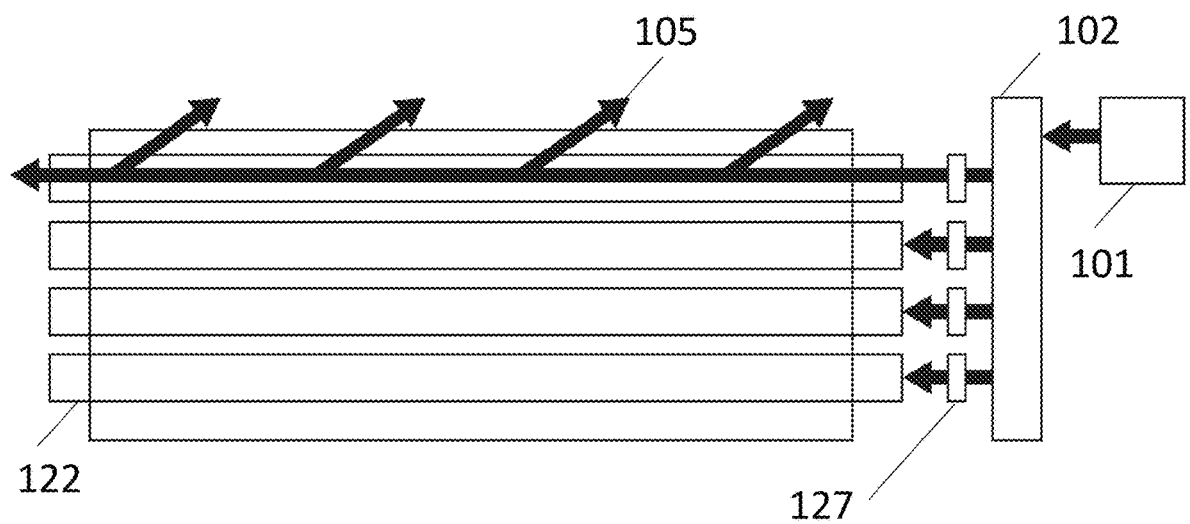
FIG. 15 is a plan view of a portion of a waveguide biosensor based on the waveguide biosensor of FIG. 2, in which an array of beam intensity modifying filters matched to the scattering cross sections of dominant Raman lines of a molecule to be detected are disposed between the pump laser beam switch and the pump beam channel array, in accordance with an embodiment of the invention.

FIG. 15 is a plan view of a portion of a waveguide biosensor in which an array of beam intensity modifying filters (127) matched to the scattering cross sections of dominant Raman lines of a molecule to be detected are disposed between the pump laser beam switch (102) and the pump beam channel array, in accordance with an embodiment of the invention.

Surface Plasmon Resonance Substrate

The surface plasmon resonance substrate is used for amplifying at least one of said laser light and the Raman scatter. Examples of surface plasmon resonance substrates that can be used in the present invention are illustrated in FIGS. 10-13. In some embodiments, such as the embodiment shown in FIG. 10, the surface plasmon resonance substrate is suitably a noble metal coating (116), such as gold, silver, or aluminium, applied to an optical substrate. In some embodiments, the surface plasmon resonance substrate can be provided by a phase-separated holographic polymer nanocomposites using noble metallic nanoparticles (gold, silver etc.). In some embodiments, the surface plasmon resonance substrate can be provided by a polymer surface nanostructured grating formed on an optical substrate and backfilled with metal nanoparticle. In some embodiments, the surface plasmon resonance substrate can be provided by noble metal nanoparticles supported by an optical substrate. In some embodiments, the surface plasmon resonance substrate can be provided by a nanostructured metallic surface. In some embodiments, the nanostructure surfaces can be fabricated using Rolling Mask Lithography (RML).

Figure 11:
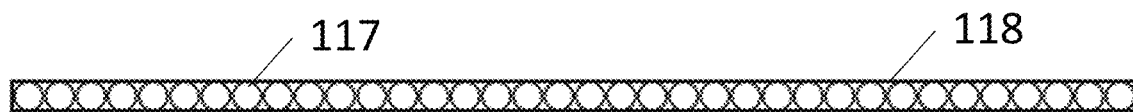
FIG. 11 is a side elevation view of a surface plasmon resonance substrate employing noble metal nanoparticles deposited onto a substrate, in accordance with an embodiment of the invention.
Figure 12:
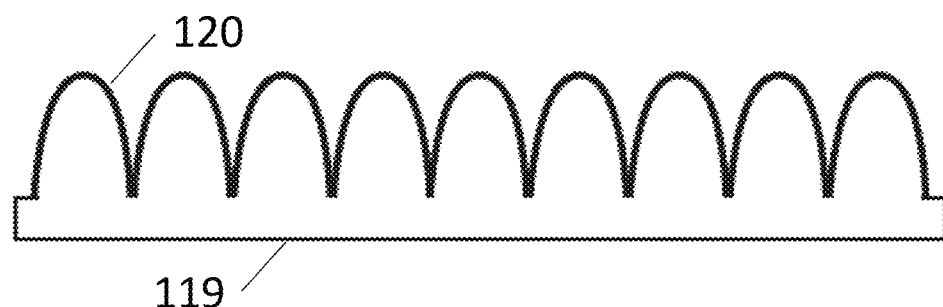
FIG. 12 is a side elevation view of a surface plasmon resonance substrate comprising a nanostructured surface to which a noble metal coating has been applied, in accordance with an embodiment of the invention.
Figure 13:
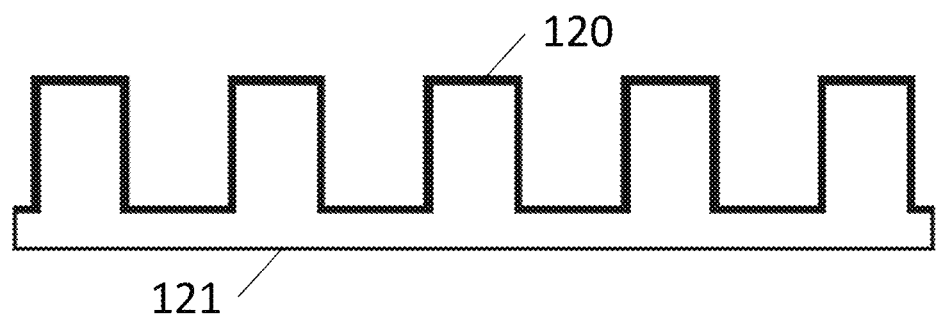
FIG. 13 is a side elevation view of a surface plasmon resonance substrate comprising a nanostructured surface formed using a phase separation process to which a noble metal coating has been applied, in accordance with an embodiment of the invention.

FIG. 11 shows a surface plasmon resonance surface comprising gold or silver nanoparticles (117) dispersed within a supporting medium (118). FIG. 12 shows a surface plasmon resonance surface formed from a substrate with a nanostructured surface (119) coated with a gold or silver film (120). FIG. 13 shows a surface plasmon resonance surface formed using a phase separation process resulting in a nanostructured surface (121) coated with a gold or silver film (120). In some embodiments, the nanostructured surface (121) can be patterned. In some embodiments, the patterning can be designed to facilitate surface plasmon intensity distributions matched to a molecule to be analyzed. In some embodiments, the surface plasmon resonance substrate can be provided by a shell of a nanoparticle. In some embodiments, the surface plasmon resonance substrate can be provided by multiplicities of plasmonic-magnetic silica nanotubes supported by an optical substrate. In some embodiments, the surface plasmon resonance substrate can be provided by a substrates supporting layers comprising a noble metal coating for forming surface plasmons and a Raman reporter molecule coating.

Figure 14:
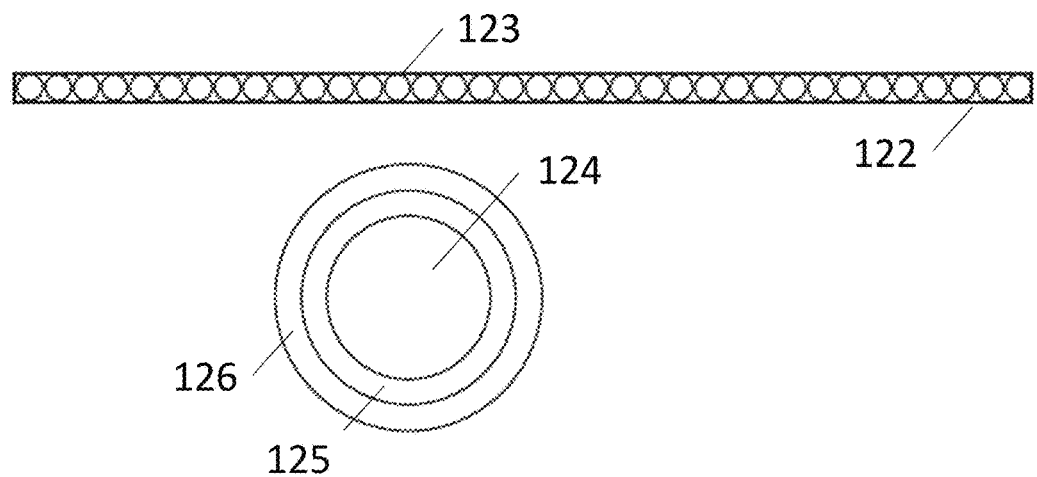
FIG. 14 is a side elevation view of a surface plasmon resonance substrate comprising nanoparticles formed from noble metal nano shells to which a Raman reporter molecule has been applied, in accordance with an embodiment of the invention.

In some embodiments, the surface plasmon resonance substrate can be provided by a substrates supporting a multiplicity of nanoparticles or nanostructures formed on said substrate with shell structures formed from layer comprising a noble metal coating and a Raman molecule coating applied to the exterior of the shell. FIG. 14 illustrates one such embodiment in which tagged nanoparticles (123) are dispersed within a supporting medium (122). Each tagged nanoparticle (123) comprises a core provided by a void or inert material (124) surrounded by a gold or silver nano shell (125) which is in turn surrounded by a Raman reporter molecule coating (126). In some embodiments, a multiplicity of optically powered elements can be disposed in a layer overlapping the surface plasmon resonance substrate for concentrating the Raman signal from surface plasmon hot spots formed by the surface plasmon resonance substrate. In some embodiments, the surface plasmon resonance substrate incorporates nanostructures for diffracting Raman scattered light. In some embodiments, the surface plasmon resonance substrate incorporates nanostructures forming a diffractive lens or mirror.

Raman Signal Channels

A plurality of Raman signal channels can be formed in or on a substrate, with each channel operative to in-couple and convey Raman scatter and further comprising an upper reflector and a lower reflector sandwiching said Raman signal channels, each Raman signal channel overlapping a pump laser channel. Each Raman signal channel supports optical structures which, in some embodiments, are formed in one or both of the upper and lower reflectors, for selectively coupling in predefined portions of the Raman spectrum emitted by the analyte. The required spectral selectivity can be provided by gratings formed in one or both of the upper and lower reflectors, the gratings having prescriptions optimized for high efficiency diffraction in said portions of the Raman spectrum. In some embodiments, optical filters can be used to filter portions of the Raman spectrum.

In some embodiments, the reflectors can be configured as at least one selected from: a diffractive surface; a Fresnel structure; a chirped diffracting or reflecting structure; a surface having a spatial variation of at least one of diffraction efficiency; reflection coefficient and transmission coefficient; a structure formed on an inclined surface; a glancing incidence surface; a birdbath reflector; a structure formed on a curved surface; and a surface coated with at least one film providing selective transmission, absorption or reflection at one or more wavelengths within the spectral bandwidth of the Raman signal.

Figure 16A:
FIG. 16A is a side elevation view of a Raman signal channel employing a tilted reflector surface, in accordance with an embodiment of the invention.
Figure 16B:
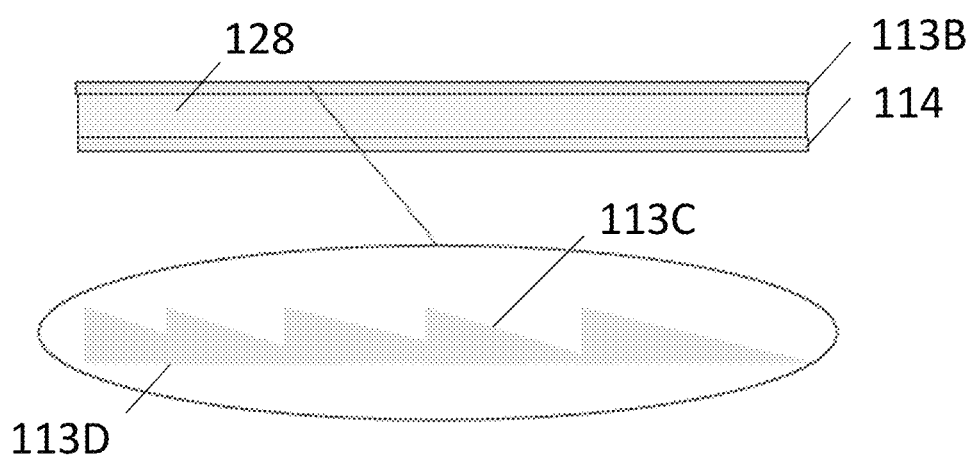
FIG. 16B is a side elevation view of a Raman signal channel employing a reflector surface incorporating a multiplicity of facets, in accordance with an embodiment of the invention.

FIG. 16A illustrates a Raman signal channel employing a tilted reflector surface, in accordance with an embodiment of invention. The channel comprises a tilted upper reflector (113A) and a lower reflector (114) sandwiching the optical medium (128) for propagating the Raman signal. In some embodiments, the Raman signal channels can contain a multiplicity of tilted partially reflecting mirrors for in coupling Raman signals from the analyte. FIG. 16B illustrates a Raman signal channel employing a facetted reflector surface (113B), in accordance with an embodiment of invention. A detail of the reflector surface illustrating the reflector substrate (113C) and the facet structure (113D) is inset in FIG. 16B. In some embodiments, a Raman signal channel can be provided by a solid or hollow light pipe having a continuous or polygonal cross-section. In some embodiments, a Raman signal channel can further comprise a light trap for capturing zero order diffracted light.

In many embodiments the signal coupled into the Raman signal channel can be confined vertically by upper and lower reflectors. The upper and lower reflectors can have grating structures coated with a metallic film to provide high efficiency reflection for light in predefined wavelength band. In some embodiments, each channel can have a unique range of K-vector directions tuned to diffract a predefined wavelength band. In some embodiments, the wavelength bands can be specified to window prominent lines in the Raman spectrum of a molecule.

As in the case of the pump laser channel array, it is important to avoid leakage of light from one channel to another. In some embodiments, the Raman signal channels can be formed by core materials embeded within the substrate, where the core refractive index is higher than the substrate refractive index. In some embodiments, the Raman signal laser channels can be formed as ridge structures disposed on a substrate surface.

In some embodiments, such as the one illustrated in FIG. 18, the required confinement of the Raman signal beams can be provided using coatings (129) designed to scatter, reflect or absorb light that might otherwise leak into an adjacent channel. The coatings (129) can be applied to substrate surface portions on either side of each channel. In some embodiments, coatings or surface etched features can be applied to the substrate's surface portions overlapping each channel. The advantage of this technique is that the need for etching or diffusion of waveguide cores into the substrate can be avoided.

Raman Signal Combiner

In some embodiments, a Raman signal combiner is provided for optically coupling the Raman signal channels to an optical path leading to the detector. In some embodiments, the Raman signal combiner can employ switchable gratings to eliminated cross talk In some embodiments, the Raman signal combiner can incorporate bandpass or high-pass/lopass filters. In some embodiments, the Raman signal combiner can include optical components for improving signal to noise ratio, such as, for example, polarization control elements.

Configurations of the Pump Laser Channels and Raman Signal Channels

In some embodiments, the plurality of pump laser channels and the plurality of Raman signal channels can sandwich the surface plasmon resonance substrate. In some embodiments, the plurality of pump laser channels and the plurality of Raman signal channels can be disposed above or below the surface plasmon resonance substrate. In some embodiments, the plurality of pump laser channels and the plurality of Raman signal channels can be combined in a single waveguide structure in which the Raman signal and the pump laser beams propagate in the same direction within the single waveguide structure, the source and the switchable beam directing module are disposed at one end of the single waveguide structure, and the Raman signal combiner and the detector are disposed at the opposite end of the single waveguide structure.

Figure 7:
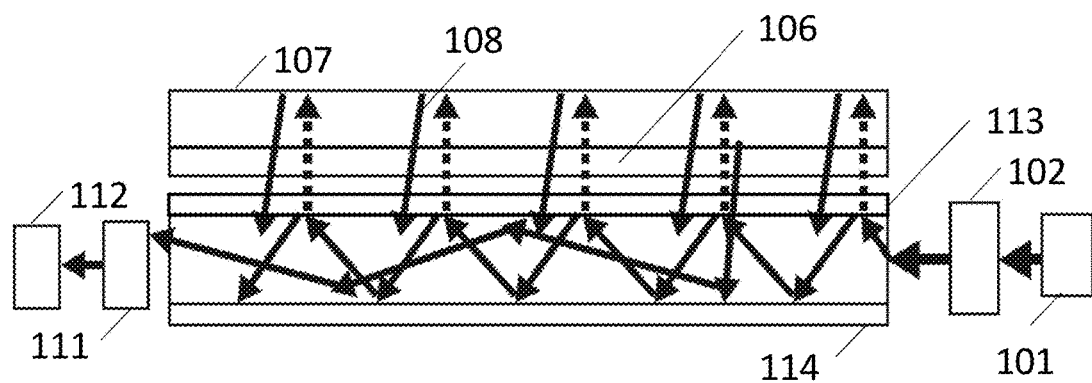
FIG. 7 is a side elevation view of a first example of a waveguide biosensor in which the Raman signal channel array and the pump laser channel array are integrated into a common waveguide structure, in accordance with an embodiment of the invention.
Figure 8:
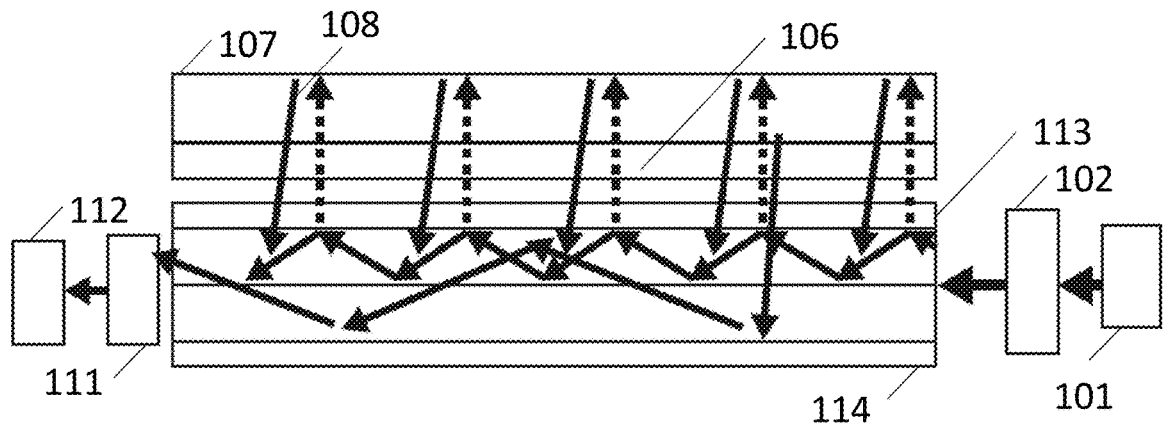
FIG. 8 is a side elevation view of a first example of a waveguide biosensor in which the Raman signal channel array and the pump laser channel array are integrated into a common waveguide structure, in accordance with an embodiment of the invention.
Figure 9:
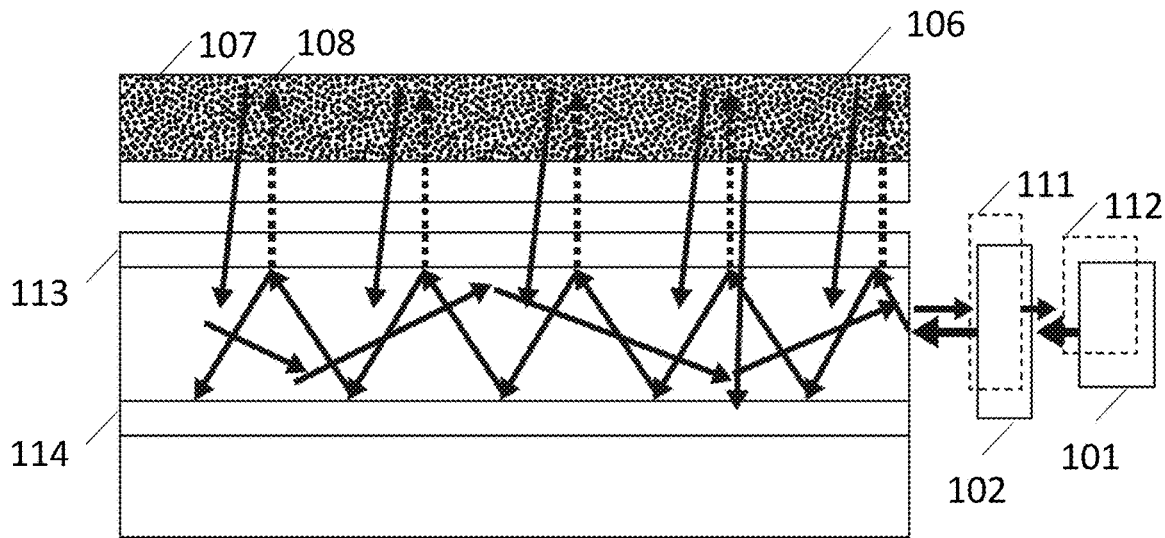
FIG. 9 is a side elevation view of a third example of a waveguide biosensor in which the Raman signal channel array and the pump laser channel array are integrated into a common waveguide structure are integrated into a common waveguide structure, in accordance with an embodiment of the invention.
Figure 10:
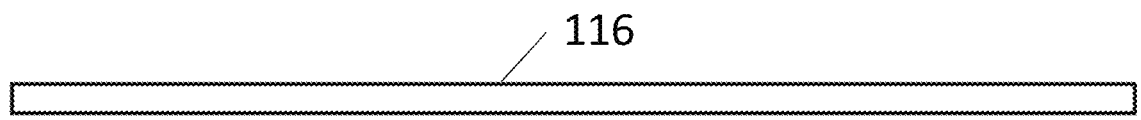
FIG. 10 is a side elevation view of a surface plasmon resonance substrate employing a noble metal layer, in accordance with an embodiment of the invention.

As illustrated in FIGS. 7-9, in some embodiments, of which the key components have already been discussed above, the plurality of pump laser channels and the plurality of Raman signal channels can be combined in a single waveguide structure in which the Raman signal and the pump laser beams counter propagate in opposing directions, the single waveguide structure and the source and the switchable beam directing module are dispose at one end of the single waveguide structure, and the Raman signal combiner and the detector are disposed at the same end of the single waveguide structure.

Types of Gratings Used

As is apparent from the above discussion, gratings can play several key roles in the biosensor of the present invention. Gratings can be used for coupling pump beams in the surface plasmon resonance substrate, and for coupling and confining light within the Raman signal channel array. Switching gratings can be used to couple laser beams from the source into each of the pump laser channels sequentially.

The switchable grating used in the present invention is preferably a Bragg grating (also referred to as a volume grating). Bragg gratings have high efficiency with little light being diffracted into higher orders. The relative amount of light in the diffracted and zero order can be varied by controlling the refractive index modulation of the grating, a property which is used to make lossy waveguide gratings for extracting light over a large pupil.

One important class of gratings is known as Switchable Bragg Gratings (SBG). SBGs are fabricated by first placing a thin film of a mixture of photopolymerizable monomers and liquid crystal material between parallel glass plates. One or both glass plates support electrodes, typically transparent indium tin oxide films, for applying an electric field across the film A volume phase grating is then recorded by illuminating the liquid material with two mutually coherent laser beams, which interfere to form a slanted fringe grating structure. During the recording process, the monomers polymerize, and the mixture undergoes a phase separation, creating regions densely populated by liquid crystal microdroplets, interspersed with regions of clear polymer. The alternating liquid crystal-rich and liquid crystal-depleted regions form the fringe planes of the grating. The resulting volume phase grating can exhibit very high diffraction efficiency, which may be controlled by the magnitude of the electric field applied across the film. When an electric field is applied to the grating via transparent electrodes, the natural orientation of the LC droplets is changed, causing the refractive index modulation of the fringes to reduce and the hologram diffraction efficiency to drop to very low levels. Typically, SBG Elements are switched clear in 30 microseconds, with a longer relaxation time to switch ON. Note that the diffraction efficiency of the device can be adjusted, by means of the applied voltage, over a continuous range. The device exhibits near 100% efficiency with no voltage applied and essentially zero efficiency with a sufficiently high voltage applied. In certain types of HPDLC devices, magnetic fields may be used to control the LC orientation. In certain types of HPDLC, phase separation of the LC material from the polymer may be accomplished to such a degree that no discernible droplet structure results. An SBG may also be used as a passive grating. In this mode its chief benefit is a uniquely high refractive index modulation.

SBGs may be used to provide transmission or reflection gratings for free space applications. SBGs may be implemented as waveguide devices, in which the HPDLC forms either the waveguide core or an evanescently coupled layer in proximity to the waveguide. The parallel glass plates used to form the HPDLC cell provide a total internal reflection (TIR) light guiding structure. Light is coupled out of the SBG when the switchable grating diffracts the light at an angle beyond the TIR condition. Typically, the HPDLC used in SBGs comprise liquid crystal (LC), monomers, photoinitiator dyes, and coinitiators. The mixture frequently includes a surfactant. The patent and scientific literature contains many examples of material systems and processes that may be used to fabricate SBGs. Two fundamental patents are: U.S. Pat. No. 5,942,157 by Sutherland, and U.S. Pat. No. 5,751,452 by Tanaka et al. which are incorporated herein by reference in their entireties for all purposes. Both patents describe monomer and liquid crystal material combinations suitable for fabricating SBG devices. One of the known attributes of transmission SBGs is that the LC molecules tend to align normal to the grating fringe planes. The effect of the LC molecule alignment is that transmission SBGs efficiently diffract P-polarized light (i.e., light with the polarization vector in the plane of incidence) but have nearly zero diffraction efficiency for S-polarized light (i.e., light with the polarization vector normal to the plane of incidence).

Many different grating types and configuration can be used to provide the detector grating. In some embodiments the grating can be a surface relief grating. Typically, such gratings are formed in etching processes. Surface relief gratings can also be formed by first recording a HPDLC grating and then flushing the liquid crystal component. In some embodiments, the detector grating can be a switchable grating (a grating electrically switchable between two diffracting states). In some embodiments, a switchable grating can be formed in a liquid crystal and polymer material system by phase separation of the monomer and liquid crystal. In some embodiments, one of the diffracting states corresponds to the grating diffracting with high efficiency and the other corresponds to the grating not diffracting and essentially acting like a transparent optical layer. In some embodiments, the grating can be switched between diffracting states using transverse fields provided by electrodes sandwich the grating. Other electrode schemes can be used.

In some embodiments, the grating can be switched between diffracting states using in-plane electric fields provided by interdigitated electrodes. In some embodiments, a switchable detector grating can be configured as an array of switchable grating elements. In some embodiments, the detector grating does not need to switch. Non-switching gratings recorded in liquid crystal and polymer material would benefit from exceptionally high refractive index modulations. It should be noted that although the figures illustrate transmission gratings, equivalent embodiments can also use reflection gratings. In some embodiments, the switching grating can be formed from a mixture including nano particles. Nanoparticles can be used to improve the electro-optical performance of the grating, in particular the switching time and switching voltage. In some embodiments, the switchable grating can be formed from a mixture including nanoparticles that can participate in chemical reaction with the sample.

In various embodiments, a switchable grating provided by at least one selected from the group of: a grating recorded in liquid crystal and polymer material system; a grating formed by the phase separation of LC and monomer; a grating formed from a mixture comprising nano particle; a grating formed from a mixture comprising magnetic nano particles; a grating formed from a mixture comprising nanoparticles that can participate in chemical reaction with the sample, backfilled a passive grating; a grating recorded in a holographic photopolymer; a surface relief grating; a grating formed by phase separation of LC and monomer and the flushing out of the final LC component of the cured grating; a grating recorded in a layer of recording material deposited using an inkjet coating process; a grating recorded in a layer of recording material using scanned laser illumination process; a grating recorded by contact copy from a master; and a grating formed using a masking process.

In some embodiments, a grating can be recorded in a layer of recording material deposited using an inkjet coating process. In some embodiments, the detector grating can be recorded in a layer of recording material using a scanned laser illumination process. In some embodiments, the detector grating can be contact copied from a master grating. In some embodiments, masking may be used as part of the grating fabrication process.

In some embodiments, nanoparticles can be introduced into the grating at some stage during grating formation or after the grating has been cured. In some embodiments, nanoparticles can fill grating voids or microcavities naturally occurring in a polymer grating as a result of the covalent single carbon bonds characteristic of the cured polymer being approximately 50% shorter than the Van der Waals bonds occurring in the liquid monomer state. As will be discussed below, in some embodiments, the nanoparticles can be magnetic nanoparticles. In some embodiments, the grating can incorporate molecular dopants that can react with a molecule in the analyte to enable its identification from the optical signature. In some embodiments, the molecular dopants form part of the mixture of reactants used to form the grating in a phase separation process. In some embodiments, the molecular dopants can be backfilled into a surface relief grating. In some embodiments, the molecular dopants can be backfilled into a surface relief grating formed by a phase separation process. In some embodiments, the molecular dopants can be deposited within a layer overlaying the grating and lying within the optical interaction zone.

In some embodiments, a grating can be configured as at least one selected from: a chirped grating; a surface relief grating; a blazed grating, a grating with spatially varying properties; a switchable grating; an array of switchable grating elements; a grating configured to interact with a microfluidic device; a grating configured to provide wavelength-specific light extraction; a grating that can be switched between a first diffracting state and a second diffracting state using in plane fields provided by interdigitated electrodes; and a grating that can be switched between a first diffracting state and a second diffracting state using transverse fields provided by electrodes sandwich said grating. In some embodiments, a grating can provide at least one function selected from the group of: polarization selectivity; polarization rotation; dynamic gain equalization; wavelength multiplexing; variable optical attenuation; spectral filtering; beam deflection; beam geometry shaping; beam focusing; coupling of light from said source into said waveguide; and coupling of light out of said waveguide on to said detector.

An Embodiment Employing an Integrated Surface Plasmon Resonance Substrate and Diffractive Detector Lens In some embodiments, several of the subsystem components discussed above can be used to provide a biosensor that uses a nanostructure substrate that provides a surface plasmon resonance substrate, while at the same time encoding a diffractive optical element for focusing the Raman signal onto a detector operating over the Raman signal spectral bandwidth. As in the embodiments discussed above, the optical structures can be partitioned into regions having diffractive properties tuned to specific wavelength bands.

Figure 19A:
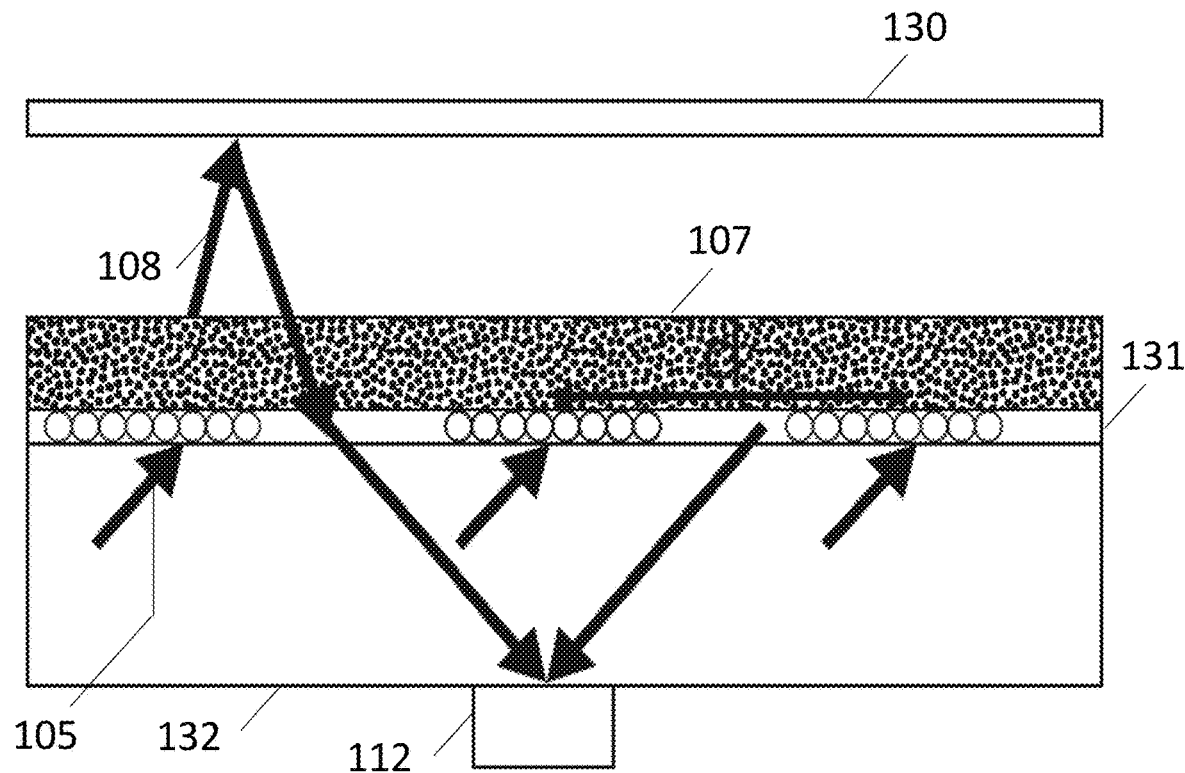
FIG. 19A is a cross-sectional view of a biosensor that integrates a surface plasmon resonance surface with a diffractive detector lens, in accordance with an embodiment of the invention.
Figure 19B:
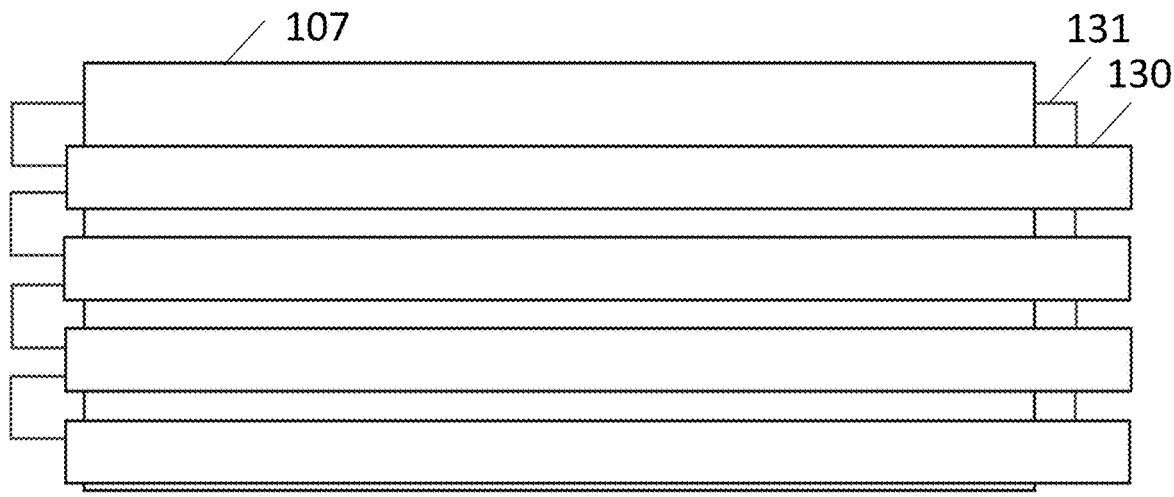
FIG. 19B is a plan view of a portion of a biosensor, based on the biosensor of FIG. 19A, that integrates a surface plasmon resonance surface with a diffractive detector lens showing the disposition of the surface plasmon resonance substrate/lens, the analyte layer and a reflector, in accordance with an embodiment of the invention.

In some embodiments, the apparatus comprises a laser emitting at least one pump wavelength for stimulating Raman scatter in molecular structure, a surface plasmon resonance substrate supporting nanostructures for forming surface plasmons integrated with a nanostructure that provides a diffractive optical element for focusing the Raman signal onto the detector, and a reflector (130). FIG. 19A illustrates a biosensor that integrates a surface plasmon resonance surface with a diffractive optical element (DOE) detector lens in an optical layer (131), in accordance with an embodiment of invention. FIG. 19B illustrates a portion of a biosensor, based on the principles of FIG. 19A (integrating a surface plasmon resonance surface with a diffractive detector lens) showing the disposition of the surface plasmon resonance substrate/lens (131), the analyte layer and a reflector (130), in accordance with an embodiment of invention.

In some embodiments, the DOE can incorporate a switchable grating array having a spatial frequency matched to the laser wavelength for coupling the laser light at points distributed over a surface. The surface plasmon resonance nanostructures amplify at least one of the pump laser light and the Raman scattered signal. In some embodiments, the surface plasmon resonance substrate/lens can be divided into DOE stripes, each operative to diffract a predefined wavelength band of the Raman signal. In some embodiments, the reflector can be divided into stripes with optical prescriptions for diffracting a predefined band of the Raman signal. In some embodiments, the stripe functions as a cylindrical lens or mirror. In some embodiments the DOE stripes can overlap the reflector stripes. In some embodiments, the elements of the switchable grating array can be stripes that overlap the reflector stripes. In some embodiments, other grating element shapes can be used as an alternative to stripes. For example, in some embodiments grating elements configured as two-dimensional arrays can be used. In some embodiments, the reflector stripes can be formed at least in part from switching gratings. In some embodiments, the surface plasmon resonance substrates can be formed using the techniques discussed above.

Figure 19C:
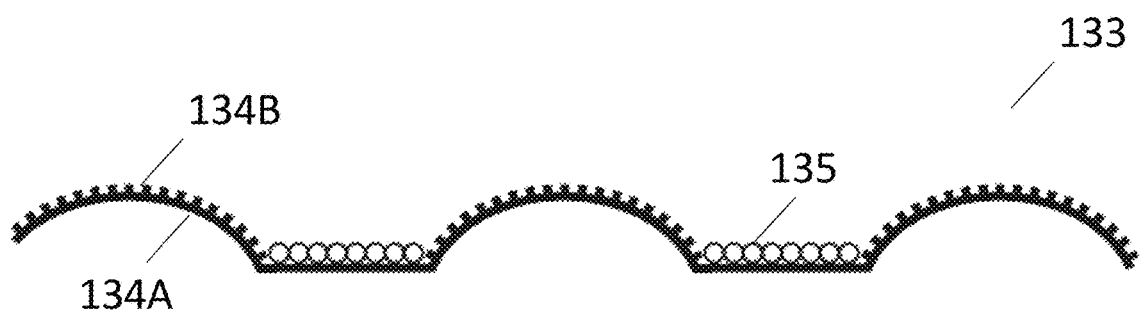
FIG. 19C is a cross-sectional view of a first example of an integration of a surface plasmon resonance surface with a diffractive detector lens based on a polymer grating structure backfilled with noble metal nanoparticles, in accordance with an embodiment of the invention.
Figure 19D:
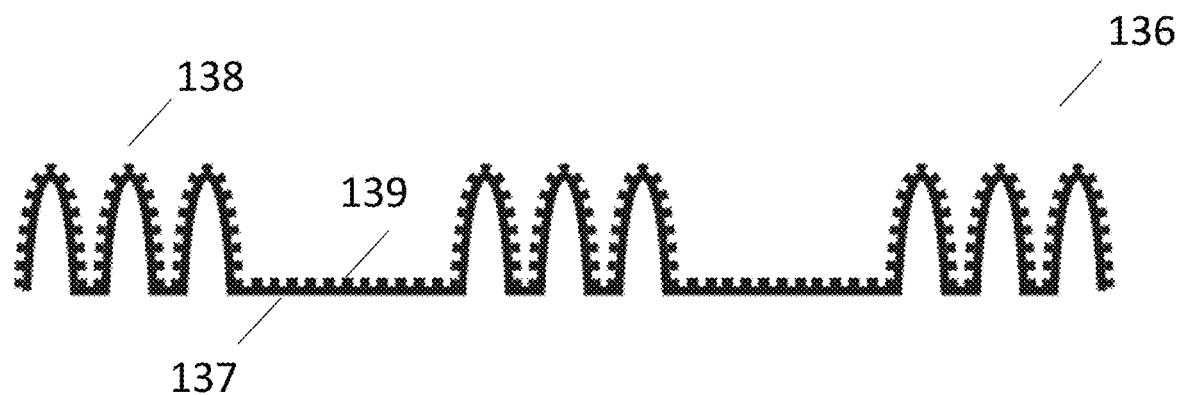
FIG. 19D is a cross-sectional view of a first example of the integration of a surface plasmon resonance surface with a diffractive detector lens based on a polymer grating structure multiplexing different grating structures for Raman excitation and Raman signal detection, in accordance with an embodiment of the invention.

FIG. 19C illustrates a first example (133) of the integration of a surface plasmon resonance surface with a diffractive detector lens based on a polymer grating structure (134) backfilled with noble metal nanoparticles (135), in accordance with an embodiment of invention. FIG. 19D illustrates a first second example (136) of the integration of a surface plasmon resonance surface with a diffractive detector lens based on a polymer grating structure (137). In some embodiments, the grating structure can include high resolution portions (138). In some embodiments, the grating structure is overcoated with a gold film (139) multiplexing different grating structures for Raman excitation and Raman signal detection, in accordance with an embodiment of invention. In some embodiments, a cavity for insertion of a substrate supported with analytes can be provided. In some embodiments, the cavity can be configured to be bounded by the plasmonic resonance surface and the reflection surface.

Detection Process

Figure 20:
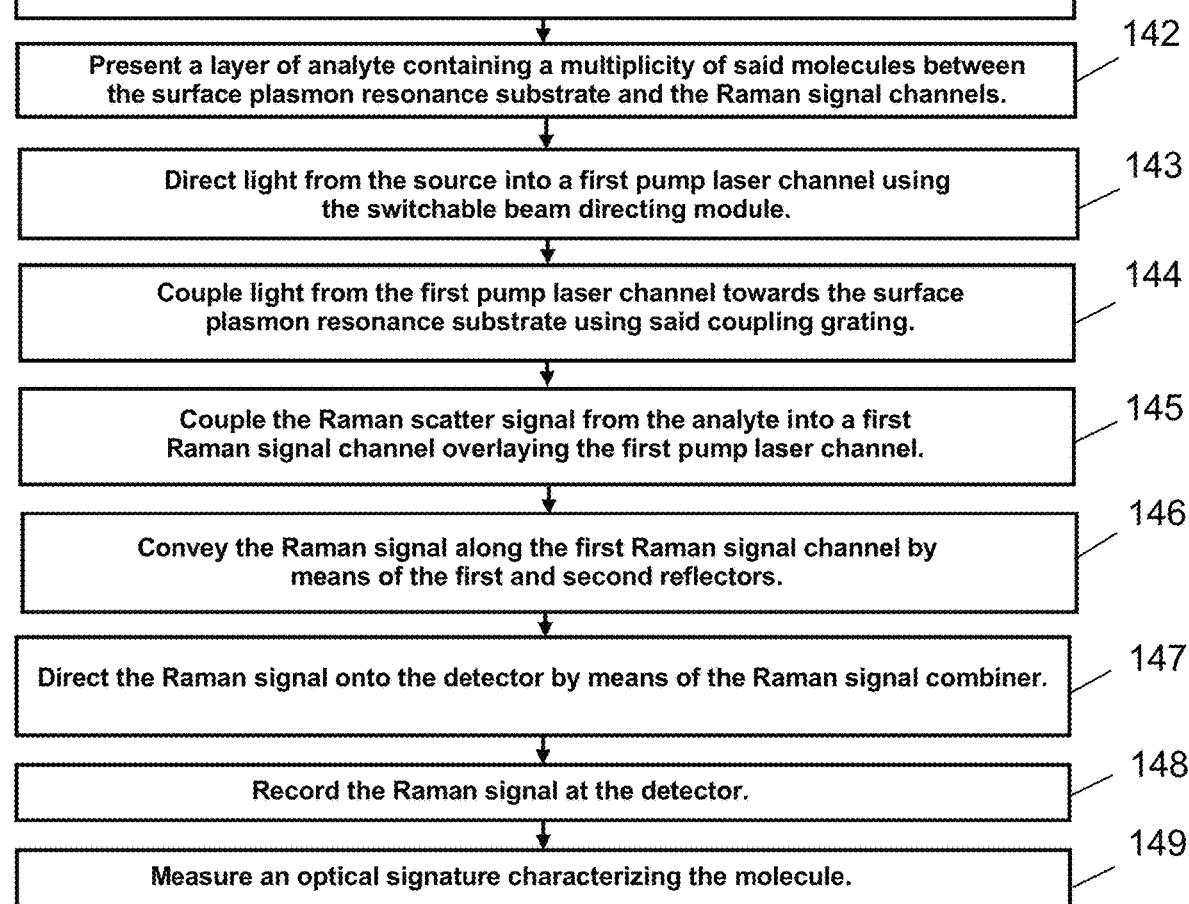
FIG. 20 is a flowchart of a process for detecting a molecule using a waveguide sensor, in accordance with an embodiment of the invention.

FIG. 20 is a flowchart of steps in a method of detecting and identifying a molecule dispersed within a sample, in accordance with an embodiment of the invention.

As shown, a method 140 of detecting a molecule is provided. Referring to the flowchart, method 140 includes the steps of:

a) providing (141) a source emitting at least one pump wavelength for stimulating Raman scatter in said molecule; a detector operating over the Raman signal spectral bandwidth; an array of pump laser channels supported by a substrate also supporting a coupling grating; a switchable beam directing module for directing light from the source into TIR paths into each of said pump laser channels sequentially; a surface plasmon resonance substrate for amplifying at least one of said laser light and the Raman scatter; a substate supporting a plurality of Raman signal channels each channel operative to in couple and convey Raman scatter and further comprising an upper reflector and a lower reflector sandwiching said Raman signal channels, each Raman signal channel overlapping a pump laser channel; and a Raman signal combiner for coupling said Raman signal channels into an optical path leading to said detector;

b) presenting (142) a layer of analyte containing a multiplicity of said molecules between said surface plasmon resonance substrate and said Raman signal channels;

c) directing (143) light from said source into a first pump laser channel using said switchable beam directing module;

d) coupling (144) light from said first pump laser channel towards said surface plasmon resonance substrate using said coupling grating;

e) coupling (145) the Raman scatter signal from said analyte into a first Raman signal channel overlaying said first pump laser channel;

f) conveying (146) said Raman signal along said first Raman signal channel by means of said first and second reflectors;

g) directing (147) said Raman signal onto said detector by means of said Raman signal combiner;

h) recording (148) the Raman signal at said detector; and i) measuring (149) an optical signature characterizing said molecule

Presentation of the Analyte

In some embodiments, the analyte is in the liquid phase. However, the present invention can also be applied in cases were an analyte is in the gaseous or solid phase, or in a multiphase system involving two or more of the above phases. In some embodiments, the analyte can comprise molecules suspended in a liquid. In some embodiments, the analyte can comprise molecules dissolved in a liquid. In some embodiments, an analyte can comprise molecules adhering to the surfaces of nanoparticles. In some embodiments, an analyte can comprise molecules absorbed within nanoparticles. In some embodiments, an analyte can comprise molecules that can react with other marker molecules to provide detectable molecular species. In yet some embodiments, an analyte sample can comprise molecules existing in the gaseous phase. In some embodiments, the analyte can have at least one surface in contact with an air gap. In some embodiments, the analyte can be in contact with a surface of the surface plasmon resonance substrate. In some embodiments, the analyte fills voids in a nanostructured surface formed by the surface plasmon resonance substrate. In some embodiments, the biosensor can further comprise a cavity for insertion of a substrate or cartridge for supporting an analyte bounded by the surface plasmon resonance surface and the Raman signal channel substate.

The biosensor can, in some embodiments, incorporate elements for subjecting the analyte to a stimulus comprising at least one of: pressure, vibration, an electromagnetic field, and temperature. In some embodiments, the phenomenon of evanescent coupling may be used to improve the efficiency of interaction between the pump laser and the surface plasmon resonance structure and the analyte. In some embodiments, evanescent coupling takes place between the pump laser channels and the analyte.

Analyte Delivery Systems

Although the present invention is primarily directed at the detection of molecules, it can also be used in conjunction with delivery of an analyte to the detector. An "optical interaction zone" essentially defines a volume from which Raman scatter from the analyte can interact with the pump laser beams and surface plasmons. The optical interaction zone can also refer to the volume of analyte that interacts with the surface plasmons resonance substrate. In some embodiments, the optical interaction zone characterizes the spatial limit of photon transfer between the analyte and one or both of the pump laser channel array or the Raman signal channel array by means of diffractive coupling. In some embodiments, the optical interaction zone characterizes the spatial limit of photon transfer between the analyte and one or both of the pump laser channel array or the Raman signal channel array by means of evanescent coupling.

In some embodiments, there is provided a sample conveyance means for transporting the analyte from an analyte injection node to an optical interaction zone in proximity to the surface plasmon resonance substrate. In some embodiments, the sample conveyance means can include at least one selected from the group of: electromagnets configured for applying a magnetic field across said analyte; a microfluidic component for control and manipulation of said analyte; an injection node for adding nanoparticles to said analyte; an electrode structure for applying heat to said analyte; an electrode structure for applying an electrical stimulus to said analyte; and means for flushing the sample from an optical interaction zone of the apparatus.

In some embodiments, the sample conveyance means can be implemented on a separate substrate overlaying the waveguide. However, in some embodiments, the sample conveyance means can be supported by one of the biosensor substrates discussed above. In some embodiments, the sample conveyance means can be based on providing an assembly of nanoparticles to which sample molecules can adhere. In some embodiments, the sample molecules can be fluorescently labelled biomarkers. The nanoparticles can, in some embodiments, have magnetic properties allowing the conveyance and manipulation of the sample to be carried out using magnetic fields. In some embodiments, acoustic fields can be used for the conveyance and manipulation of the sample.

In some embodiments, the sample conveyance means can be based on magnetic particle-based target molecule extraction and transportation methods. In some embodiments, the latter can be implemented within disposable cartridges. Magnetic nanoparticles, such as those manufactured by Nanopartz Inc. (CO), are paramagnetic highly monodisperse spherical plasmonic magnetic nanoparticles available in controlled sizes (typically with diameters from 2 nm to 250 nm) and highly monodisperse shapes. Magnetic nanoparticles can provide a very dense magnetic lattice resulting in a very high magnetic response. Properly engineered magnetic nanoparticles can be extremely magnetic and can maintain homogeneous dispersion without aggregation. Magnetic nanoparticles particles facilitate molecular detection by enabling plasmon resonance, wavelength-selective absorption, scattering and other optical properties.

In some embodiments, magnetic nanoparticles can be deposited on the detector grating. In some embodiments, magnetic nanoparticles can be deposited on a clad layer overlaying the grating. In some embodiments, magnetic nanoparticles can be integrated into the detector grating recording material. In some embodiments, magnetic nanoparticles can be dispersed in the molecular sample to be analyzed. In some embodiments, an external magnetic field can be used to direct particles along channels towards the optical interaction zone of the grating detector. In some embodiments, external magnetic fields can be used for the redispersion of sample molecules at stages in the conveyance of the sample from the sample injection node to the detector grating. In some embodiments, external magnetic fields can be used to separate different types of molecules. In some embodiments, the sample conveyance means can further include electromagnets configured for a applying a magnetic field across a channel In some embodiments, the sample conveyance means can include one or more microfluidic components for the control, manipulation and conveyance of the sample. In some embodiments, the sample conveyance means can have one or more injection nodes for adding nanoparticles to the sample. In some embodiments, the sample conveyance means can incorporate an electrode structure for applying heat to the sample. In some embodiments, electrode structure can be used for applying an electrical stimulus to the sample. In embodiments where the sample is temporarily in contact with a detector grating, means for flushing the sample from the optical interaction zone of the grating can be provided. In some embodiments, the sample conveyance means includes a cassette containing the sample which can be moved to the detector grating using an electro-mechanical drive a magneto-mechanical drive or by some other means. In some embodiments, a patterned transport propulsion system can be provided. In some embodiments, the patterned transport propulsion systems can be fabricated using 2D printing techniques. In some embodiments, where the viscosity of the sample material may not be compatible with microfluidics the sample conveyance means may be based on applying a sample to a substrate. In some embodiments, the biosensor may include a means for freeze drying the sample. In some embodiments, the sample substates can be transported from the sample injection node to the detector gratings using electro-mechanical or magneto-mechanical drives. In some embodiments, the sample molecules can be applied to magnetized nanoparticles contained within a cassette. In such embodiments, the cassette can be configured to pass between electromagnets disposed at a location along a propulsion track. In some embodiments the formation of a suspended assembly of sample-doped nanoparticles within a cassette can be carried out using laser stimuli applied to the cassette. In some embodiments, the formation of a suspended assembly of molecules applied to nanoparticles within a cassette can be carried out using acoustic or vibratory stimuli applied to the cassette. In some embodiments, the formation of a directed assembly or lattice of nanoparticle to which sample molecules can adhere can be formed by an acoustic standing wave formed within the cassette using a transducer coupled to the cassette. In some embodiments, the sample molecules can be fluorescently labelled biomarkers. In some embodiments, the acoustic standing wave can be a surface acoustic wave formed on substrate provided inside the cassette. In some embodiments, such a nanoparticle lattice formed by the above means can play the role of a detector grating. In some embodiments, acoustic waves can be used to separate different types of sample-doped molecules. In some embodiments, acoustic waves can be used to convey sample-doped nanoparticles along channels. In some embodiments, acoustic waves can be used to concentrate sample-doped nanoparticles to enhance the detected signal from the sample. In some embodiments, the concentration can be provided by acoustic focusing. In some embodiments, the concentration can be provided by vortex formation.

Other Features of the Biosensor

Many well-known techniques for improving signal-to-noise ratio and eliminating cross and stray light in optical systems can be used to improve the performance of the biosensor. In some embodiments, the apparatus can further include at least one selected from: an electrically variable refractive index medium; a dichroic filter, an apodizing filter and a MEMs device; an infrared absorption medium; a polarization filter; a polarization control component; a light integration element; and a light trap.

Applications of the Biosensor

Although the biosensor of the present invention will be discussed in relation to the detection of infectious diseases, it should be appreciated that the systems and methods disclosed herein have many other applications in many different fields such as, for example, biological research, industrial and agricultural process monitoring, pollution monitoring and others. The biosensor of the present invention can also be applied in multi-sensor systems, for example, for detecting gas, water, chemicals, heat etc. The biosensor can also be configured for use in wireless devices for medical diagnostics and monitoring, such as a non-invasive consumer glucose monitor currently being developed by MediWise Ltd. which operates in the 40 GHz (radio wave) band.

Augmentation of Surface Plasmonic Nanostructures Using Liquid Crystal Systems

In some embodiments, a reconfigurable surface plasmonic resonance substrate can combine plasmonic nanostructures with liquid crystals, enabling surface plasmon resonance substrates that can be cheaply reconfigured for detecting specific molecules. Surface plasmon and liquid crystals can also, in some embodiments, be used for spatially and/or temporally varying the characteristic of surface plasmons. In some embodiments, patterns of plasmon hot spots can be provided in this way. Current surface plasmon resonance substrates are expensive to manufacture or reconfigure for different applications. Top-down nanofabrication techniques such as electron beam lithography and focused ion beam milling allow the accurate fabrication of structures at nanoscale but suffer from high capital equipment expenses, and slow fabrication cycles. Bottom-up techniques like self-assembly can easily achieve regular patterns at a large scale at a lower cost but, in most cases, cannot be fabricated with nanometer precision. Even small changes to a nanostructure specification will require a completely new device. There is, therefore, a requirement for reconfigurable or active plasmonic devices. Many active mediums have been used to build active plasmonic devices, including liquid crystals molecular machines, elastic polymers, and chemical oxidation/reduction. Liquid crystal stands out as the best candidate. Liquid crystals possess the smallest elastic constants and the largest birefringence, spanning the visible to infrared bands and beyond, among all known materials. Liquid crystals can be chemically synthesized and processed on a very large scale, and they are also compatible with almost all technologically important optoelectronic materials. Liquid crystals can be controlled by electricity, light, acoustic waves, and other means. Efficient and versatile drive and switching techniques have been developed over the years. By integrating liquid crystals with plasmonic nanostructures, active plasmonic materials and devices with enhanced performance have been demonstrated.

As discussed above, liquid crystal can be combined with polymers to enable high index modulation switching, spatio-temporally varying refractive index modulation and versatile means for integrating complex diffractive optical devices, including Bragg gratings. In some embodiments, the liquid crystal polymer devices can be augmented by nanoparticles to provide the electro-optical properties. In some embodiments, the liquid crystal can be formed in a layer applied to a surface of the surface plasmon resonance substrate. In some embodiments, the liquid crystal can exist as a polymer and liquid crystal structures forming the dielectric layer of the surface plasmon resonance substrate.

Surface plasmons are a special kind of light formed by collective electron oscillations at the interface of a noble metal and dielectric. They can only propagate at the metal/dielectric interface and decay exponentially away from the interface. Conversion of propagating electromagnetic waves into surface plasmons requires careful matching of the wavevectors of the surfaces plasmons and the incident light.

Figure 21:
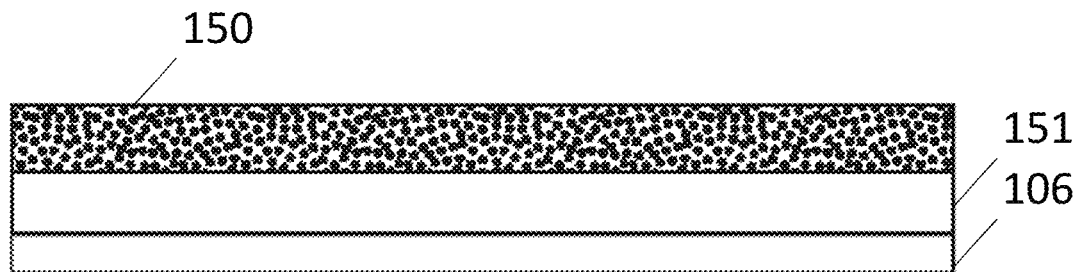
FIG. 21 is a cross-sectional view of a SERS substrate including a liquid crystal and polymer layer and a dielectric layer, in accordance with an embodiment of the invention.
Figure 22:
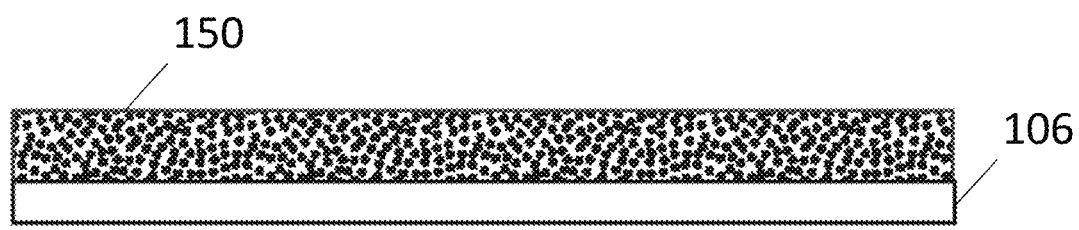
FIG. 22 is a cross-sectional view of a SERS substrate including a liquid crystal and polymer layer, in accordance with an embodiment of the invention.
Figure 23:
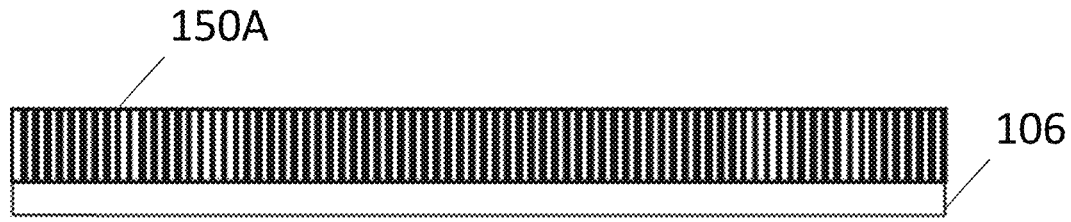
FIG. 23 is a cross-sectional view of a SERS substrate including a liquid crystal and polymer layer formed as a nanostructure, in accordance with an embodiment of the invention.

In some embodiments, a liquid crystal and polymer diffractive optical element can be used to control the wavevectors of the incident light. FIG. 21 illustrates a surface plasmon resonance substrate (106) comprising a dielectric layer (151), a noble metal layer and a liquid crystal and polymer layer (150). In some embodiments, the liquid crystal and polymer layer can have a dielectric constant that that enables surface plasmon formation. FIG. 22 illustrates a surface plasmon resonance substrate comprising a noble metal layer and a polymer and liquid crystal composite layer (150). In some embodiments, a liquid crystal and polymer layer can provide a nanostructure (FIG. 23) for controlling the spatial and temporal characteristics of surface plasmon hotspots. FIG. 23 illustrates a surface plasmon resonance substrate comprising a noble metal layer and a polymer and liquid crystal composite layer configured as a nanostructure (150A). The dielectric constants of the metal and dielectric must be compatible for efficient surface plasmon generation.

Another role for a liquid crystal and polymer layers in many embodiments can be to fine tune the relative dielectric constants at the metal and dielectric interface.

In some embodiments, the liquid crystal and polymer layer can comprise a liquid crystal and polymer network which can be aligned in 3D using directional UV light. In some embodiments the liquid crystal and polymer layer can be formed at least in part from a Liquid Crystal Polymer (LCP) network. LCPs, which are also referred to in the literature as reactive mesogens, are polymerizable liquid crystals comprising liquid crystalline monomers containing, for example, reactive acrylate end groups, which polymerize with one another in the presence of photo-initiators and directional UV light to form a rigid network. The mutual polymerization of the ends of the liquid crystal molecules freezes their orientation into a three-dimensional pattern. In some embodiments, the process can comprise coating a material system containing liquid crystal polymer onto a substrate and selectively aligning the liquid crystal directors using a directionally/spatially controllable UV source prior to annealing. In some embodiments, a liquid crystal and polymer layer is formed at least in part from a photo aligned layer such as a linearly polymerized photopolymer (LPP). An LPP can be configured to align LC directors parallel or perpendicular to incident linearly polarized UV light. LPPs can be formed in very thin layers (typically 50 nm), minimizing the risks of scatter or other spurious optical effects. Exemplary LPP materials are fabricated by Dainippon Ink & Chemicals. In some embodiments, the liquid crystal and polymer layer can be formed from LCP, LPP and at least one dopant. A liquid crystal and polymer layer based on LCPs and LPPs can be used align LC directors in complex three-dimensional geometries formed in a thin film (2-4 microns). In some embodiments, a birefringence control layer based on LCPs or LPPs further includes dichroic dyes and chiral dopants to achieve narrow or broadband cholesteric filters, twisted retarders, or negative c-plate retarders. Exemplary reactive mesogen materials are manufactured by Merck KgaA (Germany). Exemplary LC alignment layer based on LCP are manufactured by Rolic Technologies Ltd. (Allschwil, Switzerland).

Biosensor Architectures Using Raman Signal and Pump Laser Gratings with Orthogonal Grating Vectors The embodiments described above have Raman signal channels configured as waveguides aligned parallel to the pump laser channels, with each Raman channel containing gratings coupling and conveying to the detector a portion of the spectral bandwidth of the Raman signal excited by one active laser pump channel. In other embodiments, the Raman signal gratings can be arranged as a multiplicity of stripes aligned at ninety degrees to the pump laser channels. The pump laser channels perform the same function as in the other embodiments. The Raman signal grating elements are now configured to couple a portion of the spectral bandwidth of the Raman signal excited by one active laser pump channel and focus the Raman signal onto a detector via total internal reflection within a waveguiding substrate.

Figure 24:
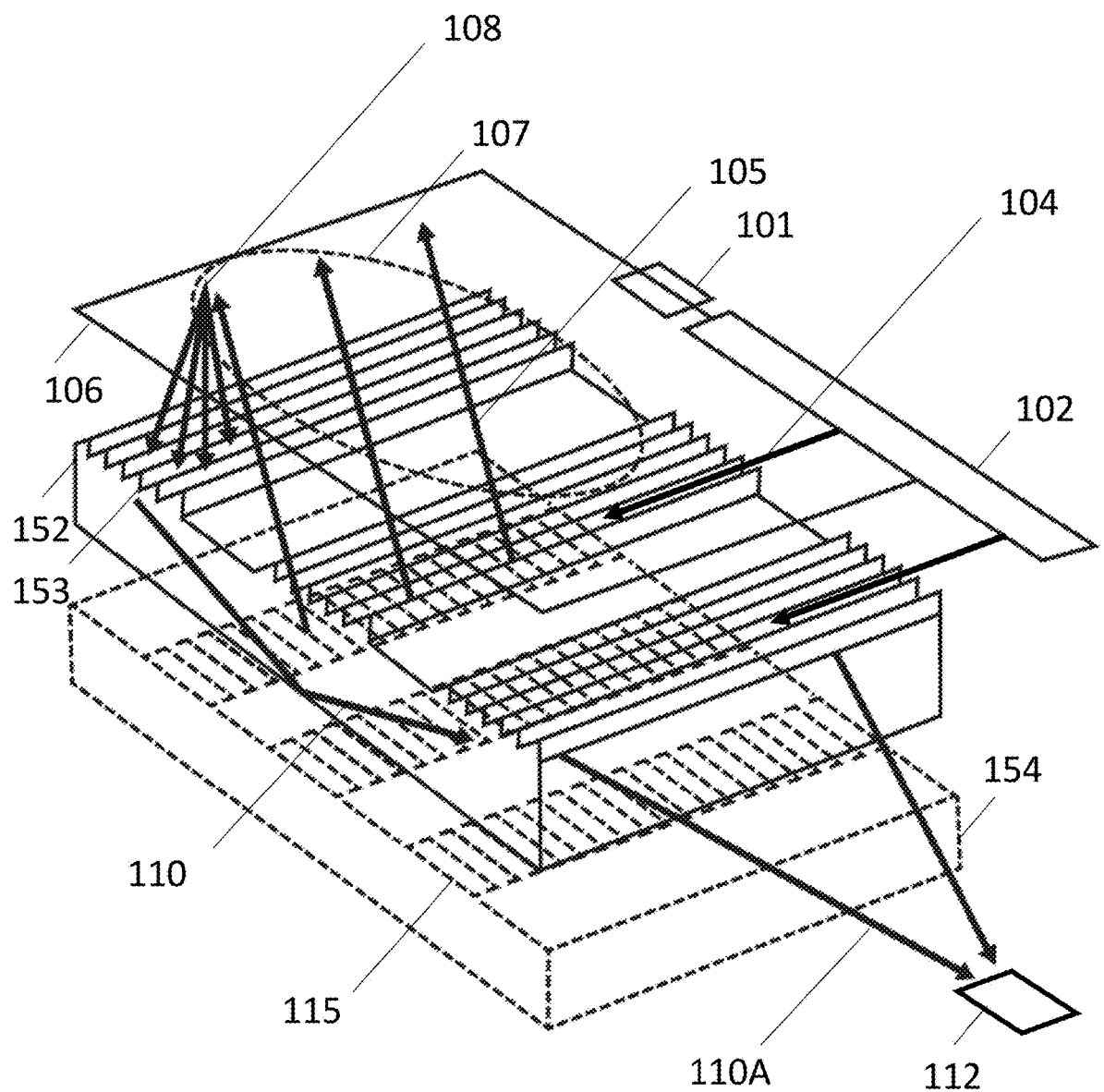
FIG. 24 is a perspective view of a biosensor including a waveguide for propagating a Raman signal and a waveguide for propagating pump laser beams, in accordance with an embodiment of the invention.

In one embodiment, shown in FIG. 24, the laser pump channels in-couple pump laser beams one channel at a time using a laser beam switching module (102), as described above. A SERS layer (106) overlays the substrate (154) containing the pump laser channels. The pump laser substrate in turn overlays a further substrate (152) containing a multiplicity of grating stripes each having a unique grating vector and grating pitch for in coupling a specific Raman signal spectral bandwidth scattered from an analyte layer (107) in contact with the SERS layers. Since the grating stripes must diffract long wavelength Raman signal (108), they will tend to have large grating features (typically around 5-10 microns for COVID-19 detection applications), in contrast to the pump laser gratings (115) which will have much lower feature spacings (typically sub-micron) for diffracting light (105) in the visible to near infrared bands. The Raman signal grating elements (153) have optical power such that they collimate light the Raman signal (110) in one plane (the waveguide cross-section to enable total internal reflection and focus it onto the detector (112) in the orthogonal plane (the plane of the waveguide)). Hence the grating structure has the prescription of a lens with differing optical power in orthogonal planes (i.e., an anamorphic lens). As in the above described embodiments, the detector can be a single element device. In some embodiments, the gratings can be arranged so that after in-coupling there are no interactions with other gratings, to avoid outcoupling. In some embodiments, this can be accomplished by arranging the Raman grating elements such that they are separated by planar regions which can be used for total internal reflection. In some embodiments, switching gratings can be used to avoid outcoupling and for eliminating other types of unwanted beam/grating interactions.

Figure 25:
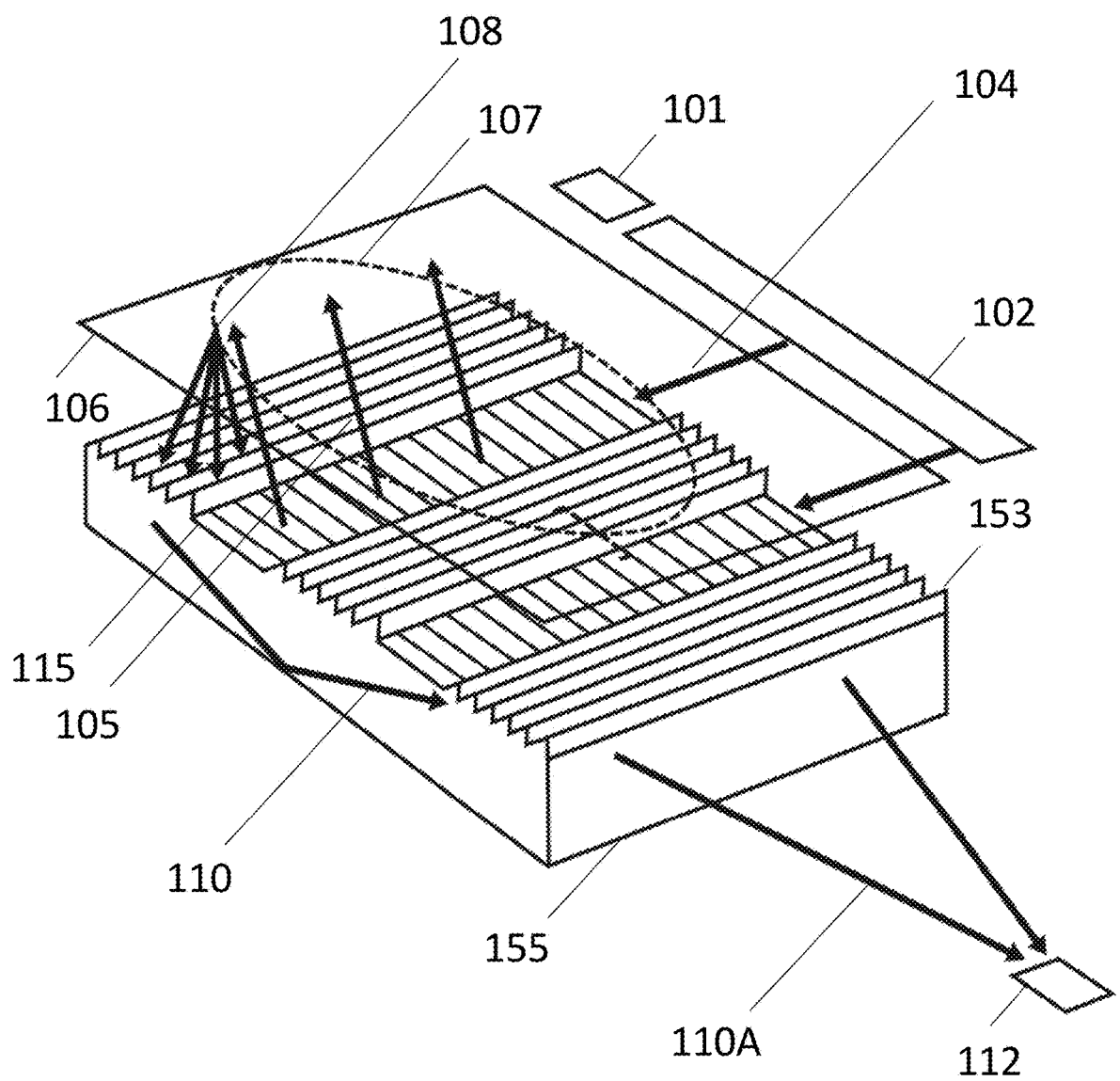
FIG. 25 is a perspective view of a biosensor including a waveguide supporting orthogonal grating structures and configured for propagating Raman signals pump and pump laser beams in orthogonal directions, in accordance with an embodiment of the invention.

In some embodiments, as illustrated in FIG. 25, the pump laser channels and the Raman signal gratings can be implemented in a single substrate (155). The two types of gratings can be volume or surface relief gratings, or combinations of the two. In some embodiments, the Raman signal gratings can be implemented as Fresnel structures. As shown in FIG. 25, the pump laser grating and the Raman signal gratings can be arranged in alternating stripes on one surface of the substrate. In some embodiments, the two sets of grating stripes can be provided on opposing sides of the substrates. The two gratings having grating vectors in orthogonal directions in the plane of the waveguides, the Raman signal gratings having surface projected grating vectors parallel to the main propagation direction of the waveguided signal. Forming the gratings on just one substrate face is highly desirable in manufacturing terms, since the number of process steps are reduced and the need for grating alignment is eliminated. In some embodiments, the gratings can be transmission gratings formed on one substrate face. In some embodiments, either or both of the two sets of grating stripes can be configured as reflection gratings. In the case of the Raman signal elements, the reflection gratings can be formed using a molding or stamping process before being overcoated by a reflection coating having high reflectivity in the Raman spectral region of interest. The pump beam switching module can be similar to the one used in FIG. 24. A Raman signal element operating in transmission can, in some embodiments, be implemented as a binary grating in which the grating feature are printed onto substates using a material opaque to the Raman signal wavelengths.

Figure 26:
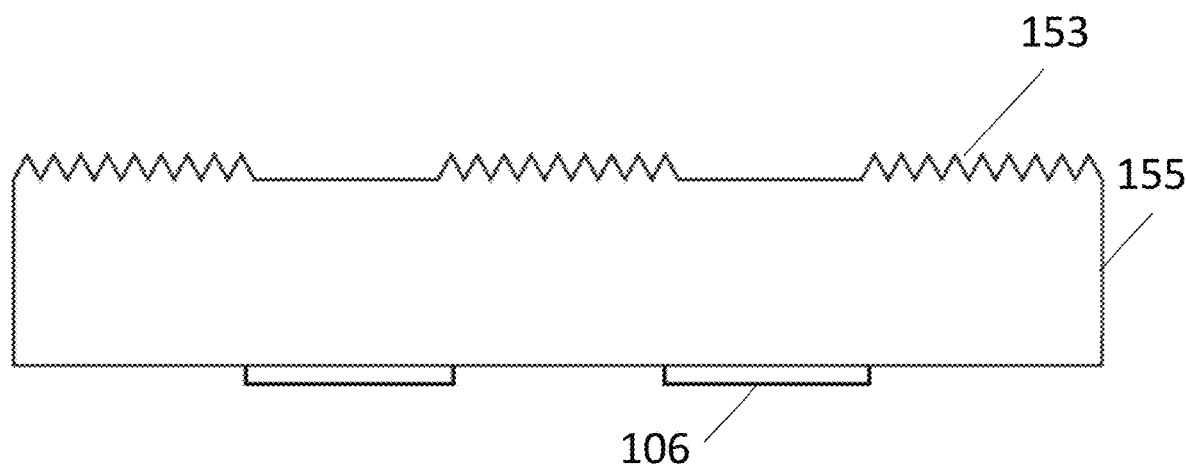
FIG. 26 is a cross-sectional view of a portion of a waveguide supporting orthogonal grating structures on one face and a SERS element on an opposing face and configured for propagating Raman signals pump and pump laser beams in orthogonal directions, in accordance with an embodiment of the invention.
Figure 27:
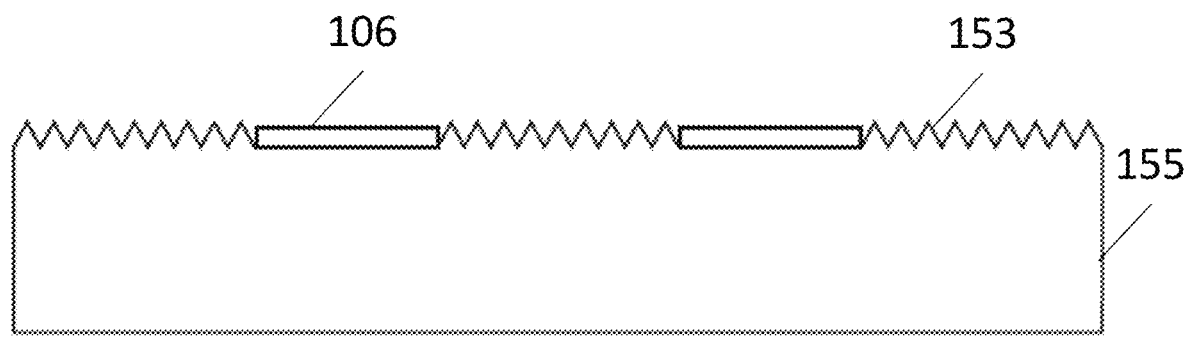
FIG. 27 is a cross-sectional view of a portion of a waveguide supporting orthogonal grating structures and SERS elements disposed on one face of the waveguide and configured for propagating Raman signals pump and pump laser beams in orthogonal directions, in accordance with an embodiment of the invention.

In some embodiments, the SERS coating (106) and the pump laser and Raman signal gratings (153) can be implemented in a single substrate (155). FIG. 26 shows a portion of a substate supporting pump laser gratings stripes and Raman signal gratings stripes in which the pump laser grating stripes are overcoated with a SERS material. In another configuration shown in FIG. 27, the SERS overcoated pump laser gratings and the Raman signal gratings can be disposed on opposing faces of the substrate. In some embodiments in which the gratings can be formed using a low-cost large volume process, the entire substrate, including the gratings and the SERS coating, can be treated a s disposable item.

In some embodiments, as an alternative to configuring the pump laser gratings and Raman signal gratings in alternating stripes, the two sets of gratings could be multiplexed. As is apparent from the drawings and the descriptions of embodiments, the laser and laser beam switching module can be configured in many different ways using various optical path folding solutions. In some embodiments, the signal collection efficiency and signal-to-noise ratio of the detector can be improved by adding at least one of: a detector lens; a light integrator; filters; apertures; and other components commonly used in detection systems.

Embodiments Using Metallic Grating Structures

As discussed above, the present invention can be implemented using many different types of gratings. In some embodiments, gratings based on metallic structures formed on substrates can offer significant advantages. One example of such a grating is a wire grid grating. Wire grid gratings are commonly used as polarizing beamsplitters. In some embodiments, metallic structure gratings can provide either passive or switching gratings. Metallic structure gratings can provide switching gratings for use with liquid crystal (LC) and monomer material systems and other types of electro-optical material systems. Metallic structure gratings can be used to switch volume gratings formed in LC and monomer systems or LC-backfilled surface relief gratings. In some embodiments, metallic structure gratings can be configured to provide in-plane switching. A further advantage of metallic structure gratings is that they can be switched at high frequencies.

Metallic structure gratings can be configured to provide a range of grating spatial frequencies to allow operation over the near ultraviolet up to LWIR and millimeter wavelength band. Hence, in a biosensor based on SERS principles, they can provide low spatial frequency gratings for Raman signal collection at wavelengths in the MWIR and LWIR infrared regions and high spatial frequency grating for Raman signal excitation at wavelengths in the UV to near infrared bands. The high refractive indices of metallic grating structures can be advantageous in many applications. In some embodiments, metallic structure gratings can be transmissive or reflective.

In some embodiments, metallic grating structures can be configured to provide any of the basic grating functionalities described above, including: slanted gratings; rolled-K vector gratings; multiplexed gratings; and chirped gratings. In some embodiments, metallic grating structures can be used to apply a thermal stimulus to a layer in contact with the gratings. In some embodiments, the thermal stimulus can be used to control refractive index modulation, average index, birefringence, LC alignment and other properties, including their spatio-temporal variations. In some embodiments, metallic structure gratings can be used as SERS substrates. In some embodiments, such gratings can be fabricated in silver or gold.

One exemplary metallic structure grating technology called NanoWeb® is manufactured by Metamaterials Inc. (Canada). This two-dimensional mesh of continuous metal wires can be fabricated onto any glass or plastic surface. It offers a superior alternative to Indium Tin Oxide (ITO), Silver Nanowire, graphene and carbon nanotube among other ITO-alternative technologies. The design of the mesh geometry allows for a highly conductive and transparent layer. Due to its extremely high conductivity, it is able to operate using very little power while remaining clear and transparent. Its grid of highly conductive lines allows more energy to pass through an open area surface versus non-patterned conductive materials. The metal mesh is typically created from silver, aluminum, platinum, copper or nickel. However, almost any type of metal could be used. The transparency depends only on geometrical design of the mesh and not the type of metal. Since the lines are of sub-micron thickness, they are effectively invisible to the human eye. In some cases, the lines have 500 nm line width with 30-micron pitch. Typical specifications are: sheet resistance: from <1 to 100 Ohm/sq.; transmission: up to 99%; haze: as low as 1%; line-width: from 0.15 to 1 micron; pitch: 2 microns and above; and thickness: 50 nm to 1 micron. NanoWeb® is manufactured using the Rolling Mask Lithography (RML®) process developed by Metamaterials Inc.

Features of Surface Plasmon Resonance Substrates Used in Some Embodiments

Various features of surface plasmons resonance substrates and, in particular, Surface Enhanced Raman Spectroscopy (SERS) substates can be used in the present invention. SERS substrates are specifically referred to in the following discussion. As discussed above, in some embodiments, such substrates can be formed from nanostructure surfaces or nanoparticles in at least partial contact with layers or assemblies of discrete particles made of noble metals such as silver or gold. In some embodiments, the nanostructures can be three-dimensional photonic crystal structures formed in LC and monomer material systems after removing LC from the cured material. In some embodiments, the photonic crystals may be recorded in mixtures of monomers and nanoparticles. The nanoparticles can in some embodiments be made of gold or silver. The nanoparticles can in some embodiments comprise a nanoparticle component and Raman reporter material. In some embodiments, the photonic crystal structures can be Bravais lattices or other regular crystalline structures. In some embodiments, the photonics crystals may be irregular crystalline structures.

In some embodiments, the nanostructures can comprise nanocolumns. In some embodiments, the nanocolumns can have separations of the order of 1 micron and feature widths of the order of 10 nanometers. In some embodiments, nanocolumns have high ratios of height to width. In some embodiments, the height of a nanocolumn is of the order of 100 nm. In some embodiments, the nanostructure can comprise star-shaped nanoparticles commonly referred to as nanostars. In some embodiments, stray light from the pump laser beam and fluorescence from the analyte can be blocked using at least one selected from the group of: an optical filter; a diffractive optical element; a polarization component; and an optical absorber. In some embodiments, the fabrication of a SERS substrate can include a step of dispersing the analyte and a salt to form agglomerations with average analyte molecule spacings of the order of 10 nm. In some embodiments, a SERS substate may employ a nanostructure, with noble metal applied to the tips of nanostructure elements (for example, nanocolumns or nanostars), that can be deformed by at least one selected from the group of: electrostatic; chemical; mechanical; and electromagnetic means to reduce the spacing of the extremities of nanocolumns, nanostars and other nanostructure features to promote high plasmon density.

In some embodiments, the nanostructure can incorporate reporter molecules. In some embodiments, the nanostructure can incorporate a layer of liquid crystal. In some embodiments, the nanostructures can incorporate a nanostructured metallic coating such as a nanoweb or wire grid grating for use in the application of an electric field that can be used for the modification of average index, index modulation, temperature and other parameters, as discussed above. In some embodiments, the nanostructure features can have spatial, height, aspect ratio, cross-section size and separation probability distributions for promoting plasmon field uniformity or specific hot spot patterns. In some embodiments, the nanostructure material can incorporate a capping agent for limiting the growth of the nanofeatures. In some embodiments, nanostructures can be patterned using polystyrene beads. In some embodiments, polystyrene bead can be introduced into a phase separation process for forming a nanostructure.

Further Applications of Phase-Separated Diffracting Structures

Embodiments have been described for combining a diffracting structure (typically a nanostructure) with a SERS substrate to provide an integrated Raman sensor. The phase separation and liquid crystal extraction processes used to make SERS nanostructures can also enable a cost-effective solutions for fabricating general-purpose dielectric diffracting structures using a roll-to-roll process. In some embodiments, phase-separated diffracting structures with feature sizes ranging from nanoscales to millimeters can enable many different applications extending across the electromagnetic spectrum including the MWIR, LWIR, microwave, and millimeter-wave bands. Since many of the diffracting structures disclosed in below will typically have feature sizes measured in millimeters (for example, structures designed for use with millimeter waves), the term nanostructure is not generally applicable. Therefore, the discussion below will refer to diffracting structures except in those cases where a nanostructure is the preferred solution. It should be appreciated that all the diffracting structures discussed below have optical properties based on the electromagnetic theory of gratings. In many embodiments, phase-separated diffracting structures of any complexity can be synthesized using holographic replication from masters. In some embodiments, the diffracting structures are scalable from tiny disposable substrates, such as may be used in the biosensors discussed above, to large area applications in vehicles and buildings.

In some embodiments, diverse optical functionalities can be provided using phase-separated diffracting structures of different optical prescriptions. For example, there is growing interest in compact devices that can integrate sensors and wireless communications. In one such group of embodiments, the present invention can provide a device combining phase-separated SERS nanostructures of the type described above with phase-separated features of lower spatial frequency that can provide antennas for wireless communication.

It should be appreciated from the embodiments described that, in general, phase separation can enable a fundamental lithographic technique that can be applied very cost effectively to very large area substrates of any surface geometry. It should also be appreciated from embodiments to be discussed below that the phase separation processes used to make diffracting structures is not limited to fabrication diffracting structures, but can also be used to fabricate pixel arrays and associated electronic signal and control circuitry in array devices, with applications in displays and high density liquid crystal displays in particular, as well as sensors (such as eye tracking, LIDAR and many others).

In some embodiments, phase-separated diffracting structures can be used in combination with diffracting structures fabricated using other processes. In some embodiments, phase-separated diffracting structures can be combined with diffracting structures with large diffracting feature sizes suitable for longer wavelength applications. Such composite structures can combine phase-separated diffracting structures and other diffracting structures on a common surface. In some embodiments, the phase-separated diffracting structures can be combined with other types of diffracting structures using multiplexing or in multiple grating layers.

In some embodiments, a diffracting structure can combine one or more diffracting structures selected from the group of:
a) a diffracting structure formed by liquid crystal and polymer phase separation followed by liquid crystal extraction;
b) a surface relief diffracting structure fabricated using nanoimprint lithographic and/or other etching processes;
c) a diffracting structure recorded into a holographic photopolymer material using a holographic exposure process;
d) a diffracting structure formed by deposition of a metal or dielectric layer patterned as a diffracting structure onto a sub state;
e) a transparent metal structure deposited on at least one substrate for switching a liquid crystal and polymer grating using transverse fields applied orthogonal to the grating or fields applied in the plane of the grating (in-plane electric fields);
f) a wavelength diverse diffracting structure;
g) a diffracting structure multiplexing at least one of wavelength and angle;
h) a SERS nanostructure;
i) a diffracting structure supported by a total internal reflection waveguide;
j) a diffracting structure supported by a substrate transparent to at least one of the wavelengths diffracted by the diffracting structures;
k) an optical substrate;
l) a metal overcoated diffractive structure;
m) a dielectric structure incorporating a feature configured as antenna for providing radiation or detection of free space propagation or surface propagation of waves;
n) a diffracting structure incorporated within a feature configured as antenna for providing radiation or detection of free space propagation or surface propagation of waves;
o) a diffracting structure operating in transmission; and
p) a diffracting structure operating in reflection Examples of diffracting structures are illustrated in FIGS. 28A-28J and are discussed below. The examples presented should not be construed as limitations on the scope of the present invention, but rather as an examples of embodiments thereof. For example, in embodiments where multiple layers are specified, the stack order may change. Hence, in some embodiments, the layers illustrated in FIGS. 28A-28J may be interchanged. In some embodiments, the ray directions shown may be reversed to provide structures that can diffractively in-couple or out-couple electromagnetic radiation. In some embodiments, the grating structures can operate in any wavelength band and can be configured for operation in more than one band. In some embodiments, the optical structures illustrated can include additional optical layers for polarization control, optical filtering, stray light control, optical path modification and other functions. In some embodiments, additional layers including any of the diffractive structures listed above may be provided. In some embodiments, more than one layer of a given type of diffractive structure may be used. In some embodiments, more than one type of diffracting structure may be formed on a substrate surface.

Figure 28A:
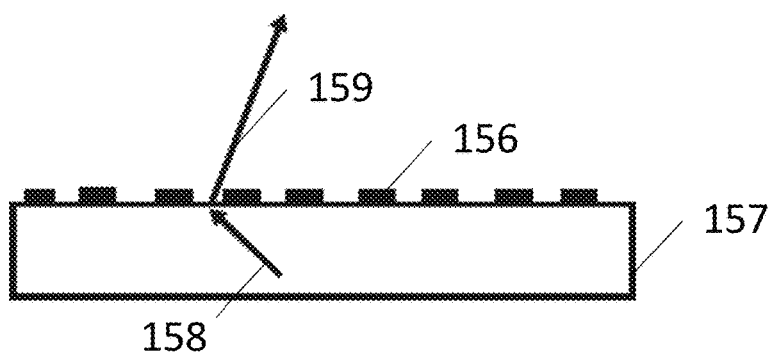
FIG. 28A is a cross-sectional view of a portion of a waveguide supporting a metallic or dielectric diffracting structure applied using a coating process showing an out-coupled ray, in accordance with an embodiment of the invention.

FIG. 28A illustrates an embodiment comprising a substrate with a diffracting structure formed by depositing a patterned transparent metal or dielectric coating (156) onto an upper surface of the substrate (157). The diffracting structure can diffract an input ray (158) incident within the waveguide into a diffracted ray path (159). In some embodiments, the substrate is a waveguide conveying electromagnetic radiation via total internal reflection. In some embodiments, the diffracting structure can diffract input rays transmitted through the lower surface of the substrate.

Figure 28B:
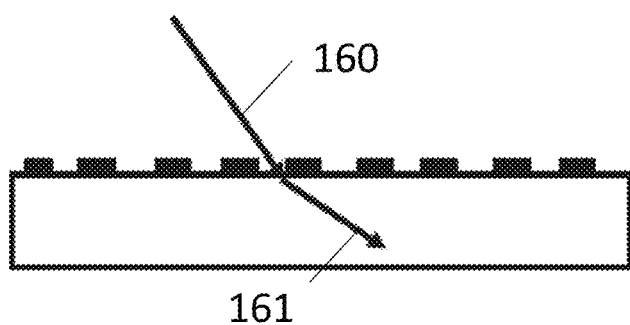
FIG. 28B is a cross-sectional view of a portion of a waveguide supporting a metallic or dielectric diffracting structure applied using a coating process showing an in-coupled ray, in accordance with an embodiment of the invention.

FIG. 28B illustrates the use of the embodiment of FIG. 28A to diffract an input ray (160) into the waveguide in some embodiments. In some embodiments, the diffracted ray (161) can be coupled into a total internal reflection path within the substrate. In some embodiments, the diffracted ray can be transmitted through the lower surface of the substrate.

Figure 28C:
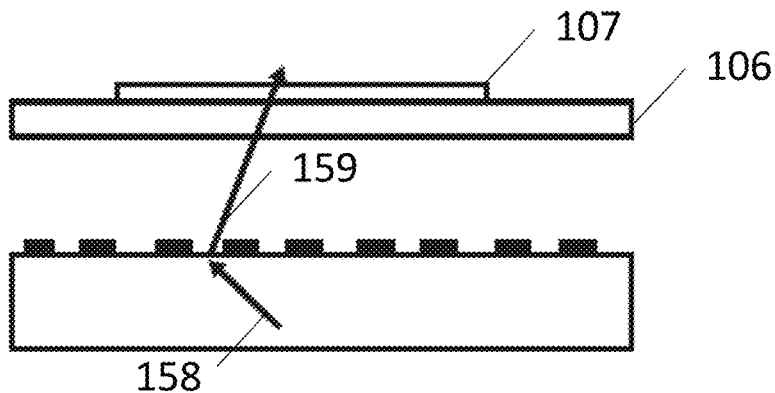
FIG. 28C is a cross-sectional view of a portion of a waveguide supporting a metallic or dielectric diffracting structure applied using a coating process configured to direct light to an analyte coated SERS substrate showing an out-coupled ray, in accordance with an embodiment of the invention.

FIG. 28C illustrates an embodiment based on the embodiment of FIG. 28A, further comprising a SERS substrate (106) in contact with a layer of analyte (107). As illustrated in FIG. 28C, an input ray (158) which, in some embodiments, is provided by a pump laser beam, can be diffracted (159) out of the substrate towards a point within the SERS/analyte interface.

Figure 28D:
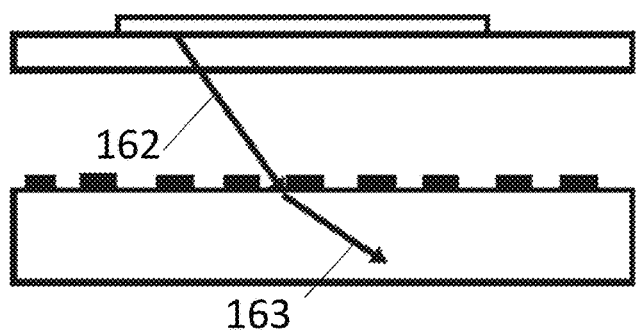
FIG. 28D is a cross-sectional view of a portion of a waveguide supporting a metallic or dielectric diffracting structure applied using a coating process configured to direct light to an analyte coated SERS substrate showing an in-coupled ray, in accordance with an embodiment of the invention.

FIG. 28D illustrates an embodiment based on the embodiment of FIG. 28C, in which a Raman scatter ray (162) generated within the SERS/analyte interface is coupled into the substrate as a diffracted ray (163) by means of the diffracting structure.

Figure 28E:
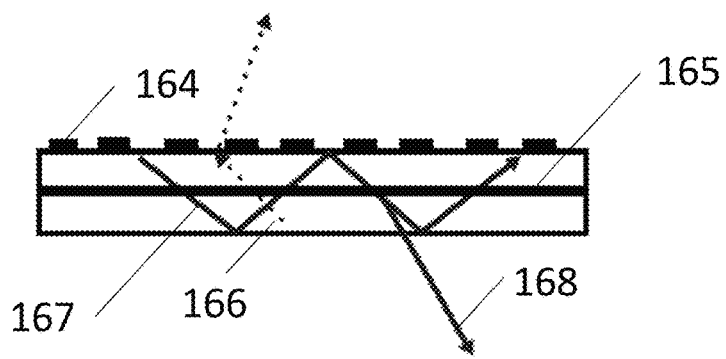
FIG. 28E is a cross-sectional view of a first operational mode portion of a waveguide supporting a metallic or dielectric diffracting structure applied using a coating process and a grating formed using phase separation, in accordance with an embodiment of the invention.

FIG. 28E illustrates an embodiment based on the embodiment of FIG. 28A, in which the substrate contains a switchable diffracting structure (165) formed in a layer. In some embodiments, the switchable diffracting structure layer can be a liquid crystal and polymer composite. In some embodiments, the substrate can convey total internally reflected electromagnetic radiation (167) which can be diffracted (168) out of the substrate by the switchable diffracting structure. In some embodiments, an input ray (166) entering the substrate via the lower optical surface can be diffracted by the surface grating structure. In some embodiments, the switchable diffracting structure can be based on a non-liquid crystal based switchable device. In some embodiments, the switchable diffractive structure can employ MEMs technology.

Figure 28F:
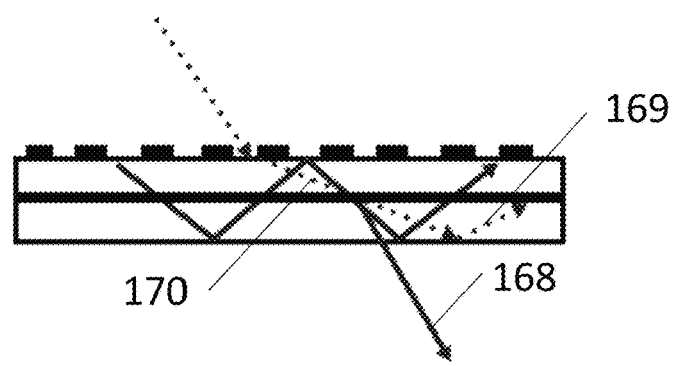
FIG. 28F is a cross-sectional view of a second operational mode of a portion of a waveguide supporting a metallic or dielectric diffracting structure applied using a coating process and a grating formed using phase separation, in accordance with an embodiment of the invention.

FIG. 28F illustrates an embodiment in which the switchable diffracting structure layer of FIG. 28E can couple an externally incident electromagnetic ray into a total internal reflection path (indicated by rays 170,169) within the substrate.

Figure 28G:
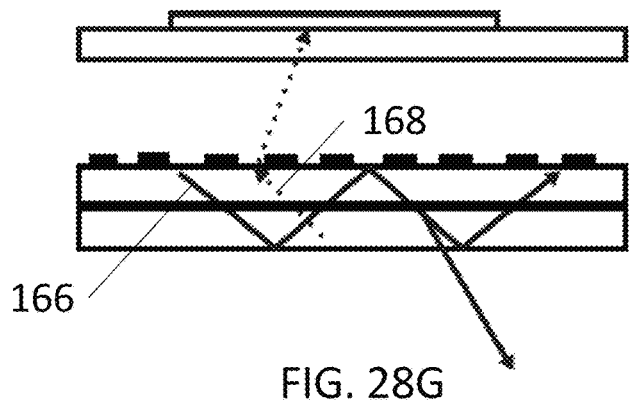
FIG. 28G is a cross-sectional view of a first operational mode of a portion of a waveguide supporting a metallic or dielectric diffracting structure applied using a coating process and a grating formed using phase separation configured to direct light to an analyte coated SERS substrate, in accordance with an embodiment of the invention.

FIG. 28G illustrates an embodiment based on the embodiment of FIG. 28E, further comprising a SERS substrate in contact with a layer of analyte. As illustrated in FIG. 28G, a ray (168) from a pump laser beam can be diffracted out of the substrate towards a point within the SERS/analyte interface.

Figure 28H:
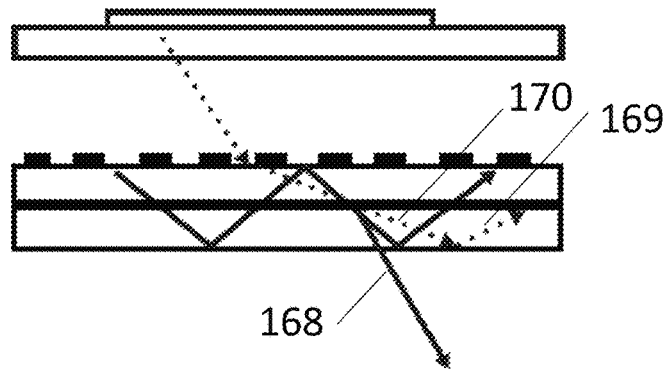
FIG. 28H is a cross-sectional view of a second operational mode of a portion of a waveguide supporting a metallic or dielectric diffracting structure applied using a coating process and a grating formed using phase separation configured to direct light to an analyte coated SERS substrate, in accordance with an embodiment of the invention.

FIG. 28H illustrates an embodiment based on the embodiment of FIG. 28G, in which a Raman scatter ray can be coupled into the substrate by means of the diffracting structure. In some embodiments, the diffractive structures formed by depositing a patterned transparent metal or dielectric coating onto an upper surface of the substrate in FIGS. 28E-28H can also function as transparent electrodes for switching the switchable grating structures into diffracting and non-diffracting states. The electrodes can also be used to provide a continuous range of diffraction efficiency over the range from substantially zero diffraction to a maximum diffraction efficiency. Electrodes formed on one substrate surface, as illustrated in FIGS. 28E-28H, can be used for applying electric files in directions parallel to the plane of the switchable grating structure. Such switching schemes are often referred to as in-plane switching. Where it is necessary to apply an electric field across a switchable grating structure, an additional transparent electrode can be applied to the lower surface of the substrate. In some embodiments, the lower electrode can be unpatterned. In some embodiments where the electric field must have precisely defined directional characteristics, the lower electrode can be patterned. In some embodiments, at least one of the upper or lower electrodes can be diffracting structures designed to provide spatially (in the substrate plane) and directionally varying electrical fields. In some embodiments, electrodes can have electrical and magnetic characteristics that are dynamically reconfigurable using applied electromagnetic fields.

Figure 28I:
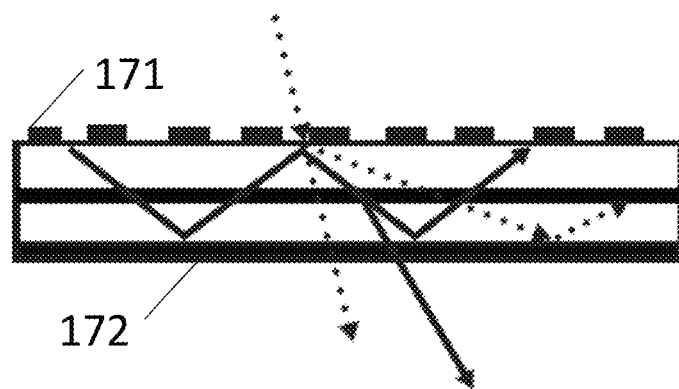
FIG. 28I is a cross-sectional view of a portion of a waveguide supporting a grating formed using phase separation with a patterned electrode applied to the upper surface of the waveguide and a non-patterned electrode applied to the bottom surface of the waveguide, in accordance with an embodiment of the invention.
Figure 28J:
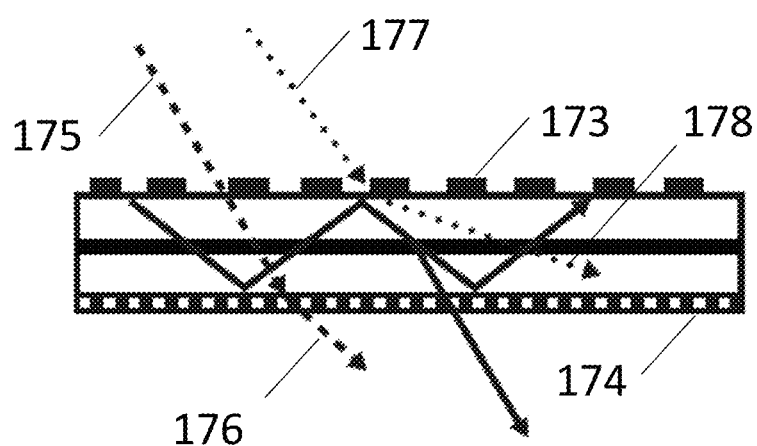
FIG. 28J is a cross-sectional view of a portion of a waveguide supporting a grating formed using phase separation with a grating configured to diffract first wavelength light applied to the bottom surface of the waveguide and a grating patterned to diffract second wavelength light applied to the top surface of the waveguide, in accordance with an embodiment of the invention.

FIG. 28I illustrates an embodiment based on the embodiment of FIG. 28F in which the upper transparent electrode (171) (which also functions as a diffractive structure for coupling electromagnetic radiation into the sub state) is patterned while the lower transparent electrode (172) is unpatterned. The present invention allows flexibility in the way diffractive structures can be configured to provide a wide range of optical functions. FIG. 28J illustrates an embodiment based on the principles discussed above, and is designed to diffract external electromagnetic radiation in more than one band while conveying other electromagnetic radiation bands via total internal reflection within a substrate. The apparatus comprises a substrate with an upper transparent electrode (173) patterned for diffracting first wavelength rays (175) and a lower transparent electrode (174 patterned for diffracting second wavelength rays (177). A first wavelength diffracted ray (176) is shown.

Figure 29A:
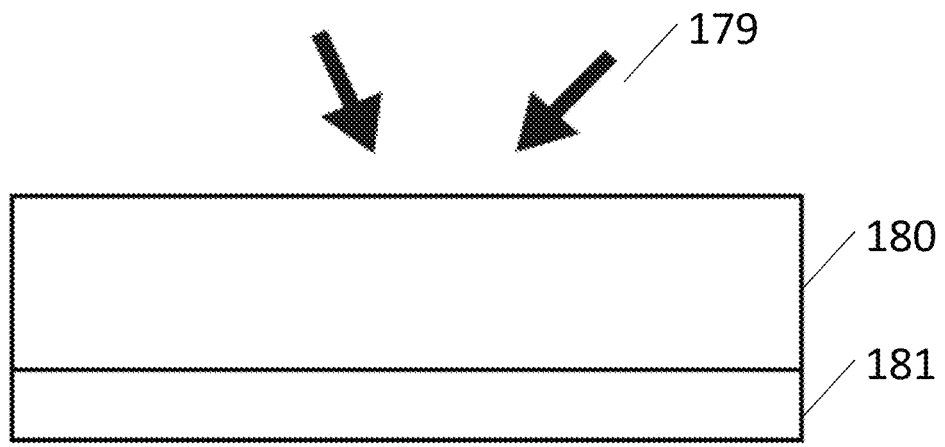
FIG. 29A illustrates a first step in the formation of phase-separated grating comprising depositing a liquid crystal and monomer layer onto a substrate, in accordance with an embodiment of the invention.
Figure 29B:
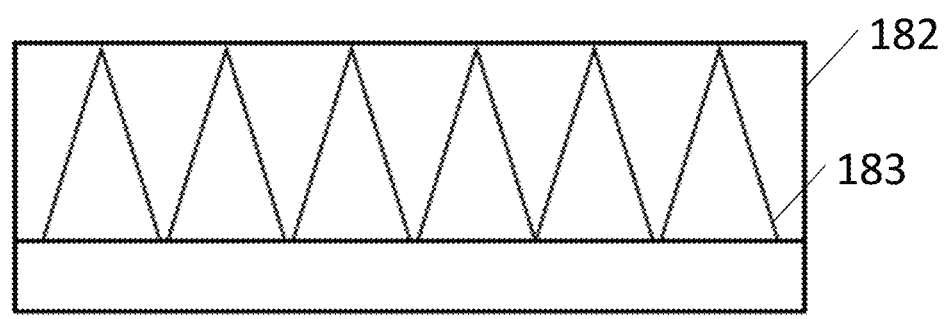
FIG. 29B illustrates a second step in the formation of phase-separated grating comprising phase separating the liquid crystal and monomer layer into liquid-crystal-rich and polymer-rich grating regions, in accordance with an embodiment of the invention.
Figure 29C:
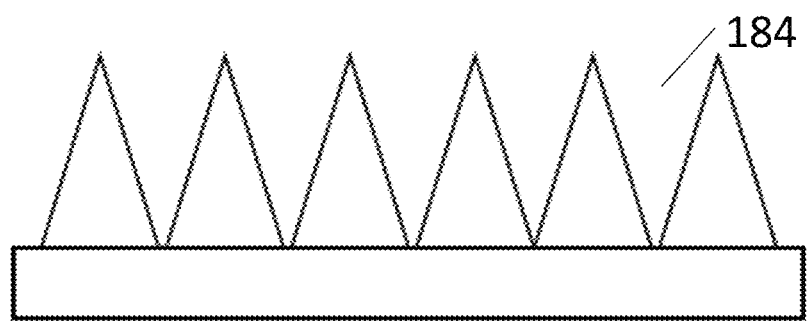
FIG. 29C illustrates a third step in the formation of phase-separated grating comprising removing the liquid crystal from the grating, in accordance with an embodiment of the invention.
Figure 29D:
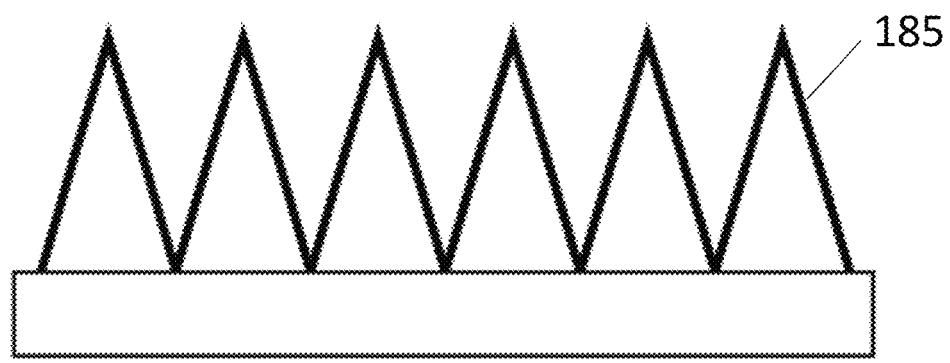
FIG. 29D illustrates a fourth step in the formation of phase-separated grating comprising metal-coating the polymer grating formed by removing the liquid crystal, in accordance with an embodiment of the invention.
Figure 29E:
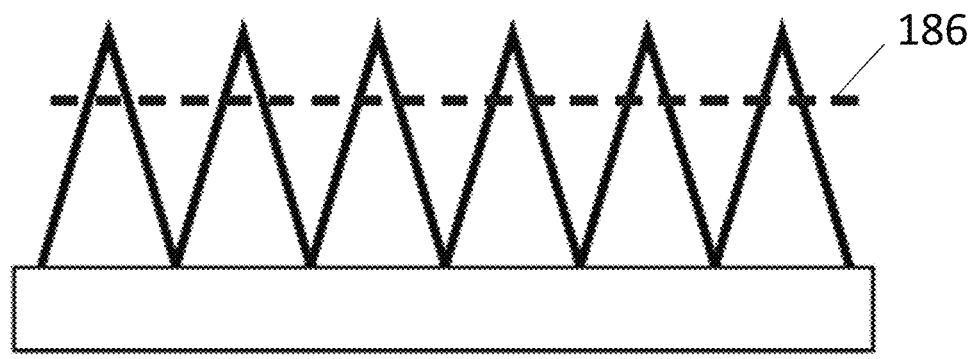
FIG. 29E illustrates a fifth step in the formation of phase-separated grating comprising the removal of an upper layer of the coated grating material, in accordance with an embodiment of the invention.
Figure 29F:
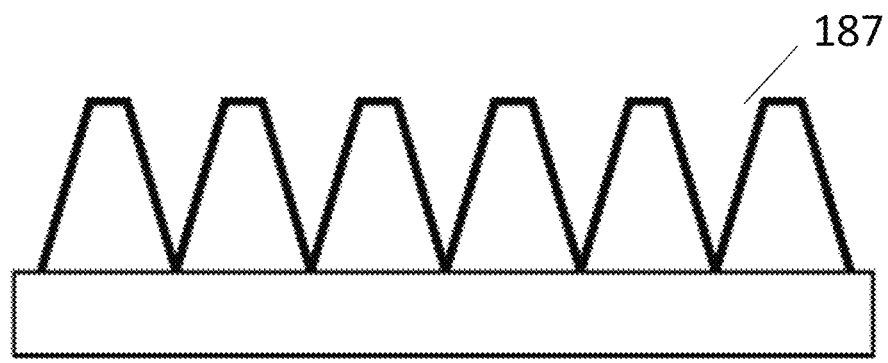
FIG. 29F illustrates a sixth step in the formation of phase-separated grating show a finished planarize composite grating structure, in accordance with an embodiment of the invention.

FIGS. 29A-29F illustrate steps in a process for fabricating a phase-separated partially metallized diffracting structure. FIG. 29A illustrates an optical substrate (181) coated with a mixture of a liquid crystal and a monomer (180). FIG. 29B illustrates the exposed diffracting structure formed after phase separation into polymer-rich (183) and liquid crystal-rich (182) regions has taken place. FIG. 29C illustrates the diffracting structure (184) formed after evacuation of liquid crystal. FIG. 29D illustrates a metal coating (185) deposited over the diffracting structure. FIG. 29E illustrates the removal of a portion (186) of the metal coating. FIG. 29F illustrates a planarized composite polymer and metallized polymer diffracting structure (187) formed after removal of the portion of the metal coating. Planarizing the diffracting structure in this way can facilitate interfacing to other layers such as, for example, SERS substrates and can also eliminate non uniformities in roll-to-roll printing processes).

Figure 30:
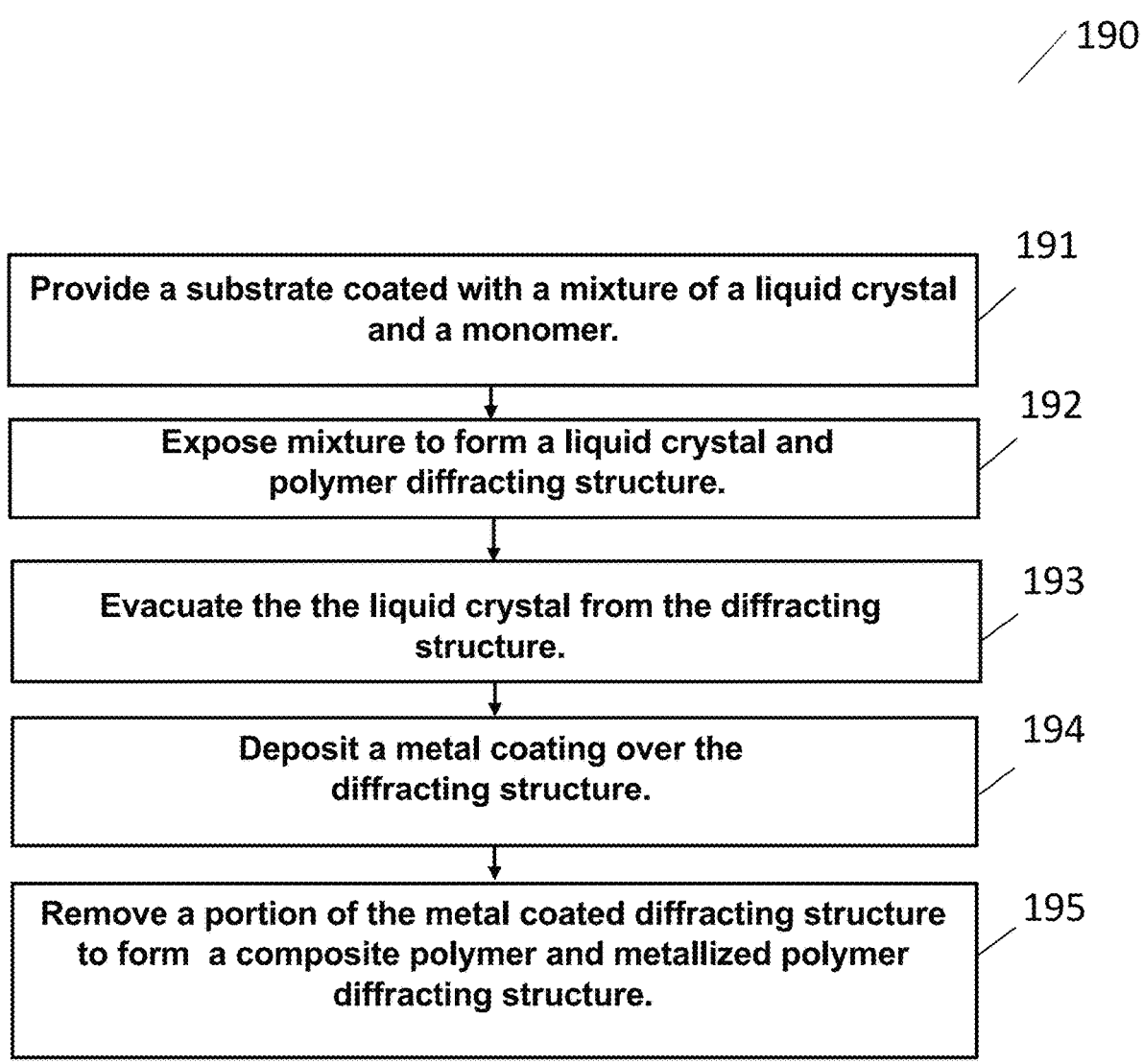
FIG. 30 is a flowchart of a process for fabricating a composite polymer and metal grating structure, in accordance with an embodiment of the invention.

FIG. 30 is a flowchart of steps in a method of fabricating a phase-separated partially metallized diffracting structure, in accordance with an embodiment of the invention. As shown, the method 190 of fabricating a phase-separated partially metallized diffracting structure is provided. Referring to the flowchart, method 190 includes providing (191) a substate coated with a mixture of a liquid crystal and a monomer. The mixture can be exposed (192) to form a liquid crystal and polymer diffracting structure. The liquid crystal component can be evacuated (193) from the diffracting structure. A metal coating can be deposited (194) on the diffracting structure. A portion of the metal coat coating can be removed (195) to form a planarize composite polymer and metallized polymer structure.

Millimeter Wave Applications of Phase-Separated Grating Structures

Figure 31:
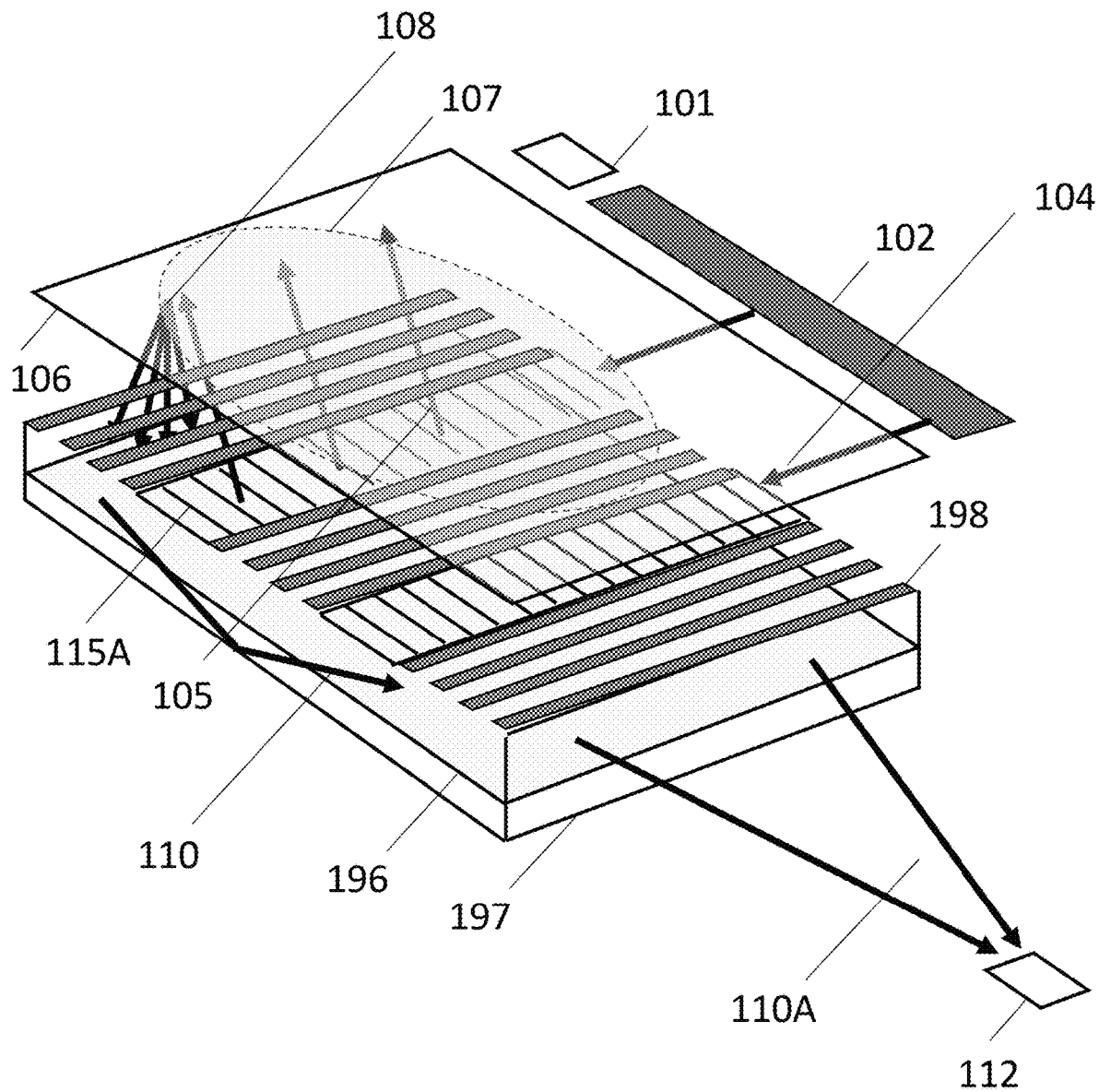
FIG. 31 is a perspective view of a biosensor including a waveguide for propagating a Raman signal and propagating pump laser beams and further comprising a switchable diffractive structure, in accordance with an embodiment of the invention.

As discussed above, the present invention has many applications in the field of millimeter wave systems. Examples of millimeter wave applications using phase-separated grating structures which can employ any of the diffractive structures discussed above include:
 a) mirror films for various 5G, 6G applications;
 b) anti-reflection films (e.g. for increasing transmission into skin);
 c) diffractive films with optical power;
 d) multifunctional films combining gratings for sensing and wireless communication and other functions and including antenna electronics real estate combined with SERS nanostructures for Raman detection;
 e) frequency agile diffractive structures using switching gratings.
 f) angle diversity structures;
 g) diffractive structures for wireless free-space power transfer;
 h) dynamic mirrors;
 i) synthetic aperture imaging; and
 j) phased arrays Gratings Formed Using Coating Processes In some embodiments, a diffracting structure can be formed using a coating process in which a patterned metal or dielectric layer is applied to a substrates surface. Examples include:
 a) diffracting structures formed by coating a grating pattern onto a substrate using masks;
 b) diffracting structures formed by coating a grating pattern onto a substrate using an inkjet printing process.
 c) transparent gratings formed from a conductive material, for use in either passive or switching modes, deposited on a substrate;
 d) diffracting structures that are opaque in one or more designated bands and transparent in one or more other bands;
 e) diffracting structures provided by conductive material deposited onto a substrates for the purposes of switching a layer containing liquid crystal or switching a grating formed from a liquid crystal and monomer material system;
 f) electrodes that can be used for switching polymer/LC diffracting structures whilst providing an opaque grating structure for diffracting Raman scattered light from an analyte/SERS interface or diffracting the pump laser light into the analyte/SERS interface;
 g) electrodes as described above configured to provide either orthogonal or in-plane electric fields FIG. 31 illustrates a biosensor based on the embodiment of FIG. 25. The Raman signal grating elements and pump laser gratings are replaced in FIG. 31 by metal or dielectric grating elements (198) formed used a coating process on the substrate 197. The surface diffraction structures can provide electrodes for switching a liquid crystal and polymer diffracting formed within the waveguide as discussed above. In some embodiments, the substrate (197) can incorporate a switchable diffractive structure (196).

Reconfigurable Diffracting Structures

Due to their large birefringence and moderately low loss, liquid crystals (LCs) are a promising dielectric media for development of a variety of reconfigurable and tunable devices extending across the electromagnetic spectrum including infrared microwaves and millimeter-wave with properties that can be designed by suitable choice of dielectric and elastic constants and other LC parameters. Devices combining LC material with diffractive structures offer potential for devices such as angle and frequency selective, adaptive arrays, beam steering and many others.

Liquid crystals possess the smallest elastic constants and the largest birefringence, spanning the visible to infrared bands and beyond, among all known materials. Liquid crystals can be chemically synthesized and processed on a very large scale, and they are also compatible with almost all technologically important optoelectronic materials. Liquid crystals can be controlled by electricity, light, acoustic waves, and other means. Efficient and versatile drive and switching techniques have been developed over the years. By integrating liquid crystals with plasmonic nanostructures, active plasmonic materials and devices with enhanced performance have been demonstrated. As discussed above, liquid crystal can be combined with polymers to enable high index modulation switching, spatio-temporally varying refractive index modulation and versatile means for integrating complex diffractive optical devices, including Bragg gratings. In some embodiments, the liquid crystal polymer devices can be augmented by nanoparticles to provide the electrooptical properties.

Phase Separation as a Large Area Lithographic Process

Figure 32:
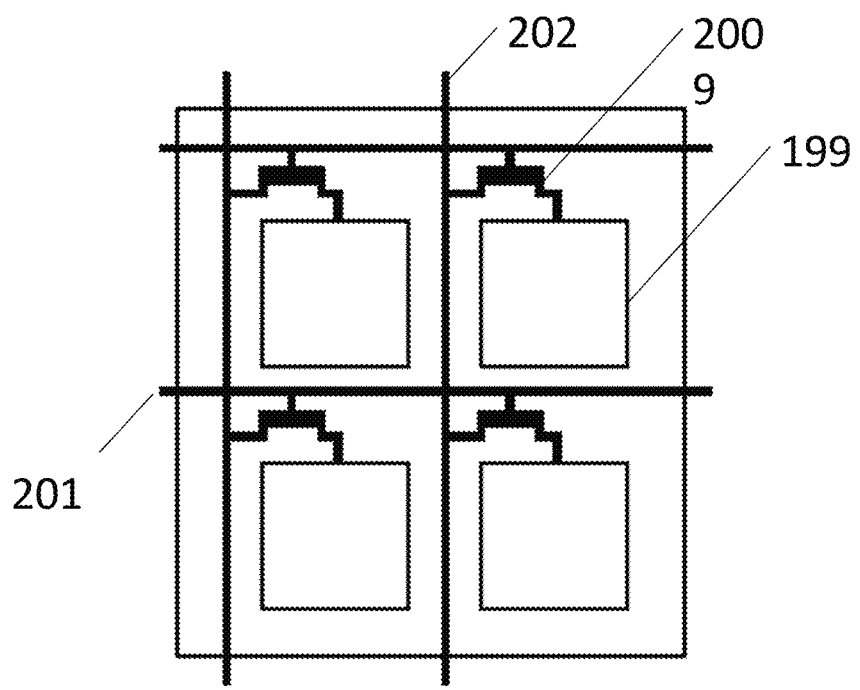
FIG. 32 is a plan view of elements of an active matrix thin film transistor type pixel array in which the pixel electrodes and signal and control circuitry are formed using a phase separation process, in accordance with an embodiment of the invention.

Phase-separated diffracting structures can provide high resolution switchable arrays for use in displays including liquid crystal displays and other types of spatial light modulators. Light field displays, for example, require high pixel density arrays with pitches as low as 1-2 microns to achieve acceptable field of view, image resolution and eyebox. Arrays with such feature resolutions are not cost effective to manufacture using current volume processes for depositing transparent electrodes (using materials such as ITO). Roll-to-roll lithographic processes, such as RML, suffer from periodic pitch variations due to the compressibility of rollers making lining up array elements with drive circuitry very challenging. FIG. 32 illustrates elements of an active matrix thin film transistor (200) type array in which the pixel electrodes (199) and signal (202) and control circuitry (201) are formed using a phase separation process similar to the one used for fabricating the phase-separated diffracting structures discussed above. The arrays can be of any size and can be formed on curved substrates. The required array pixel sizes, pitches and circuitry dimensions required in high density light field displays and in many other array applications are well within the resolution capability of the phase separation technique.

Phase Separation Structures for Wireless Applications

Wireless communication applications require an antenna to enable functionalities such as beam steering, direction finding, radar, etc. Reconfigurable antennas can switch between functions using a single structure eliminating the need for multiple antennas. Antenna reconfiguration to provide different functionalities can be achieved through a change in the antenna's geometry and/or electrical behavior. Reconfigurable antennas typically have two or more discretely or continuously switchable states. These different states are normally obtained by changing current paths of the antenna through either rearranging the antenna itself or altering its surrounding medium. Reconfigurable antennas have been applied in radiofrequency (RF) systems for wireless and satellite communication, imaging and sensing. In some embodiments, a reconfigurable antenna can be provided by incorporating a dynamically reconfigurable diffracting structure including a liquid crystal component.

Figure 33:
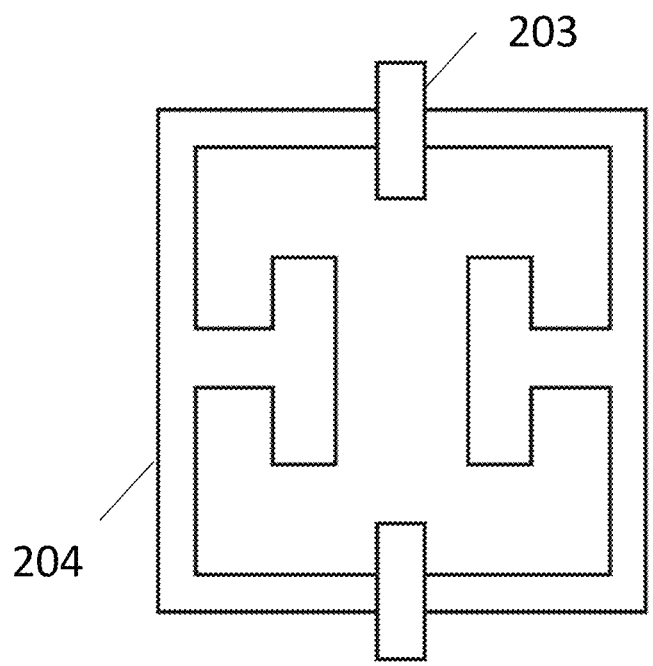
FIG. 33 is a plan view of elements of an antenna comprising a nanostructure incorporating a liquid crystal component, in accordance with an embodiment of the invention.

FIG. 33 conceptually illustrates one example of an antenna (204) which incorporates a reconfigurable diffracting structure, including a liquid crystal component (203). In such embodiments, liquid crystal diffracting structures can be used to modify local currents of a metal-based antenna to reconfigure its radiation parameters.

In some embodiments, nanostructures for use with SERS substrates can be formed from a phase separation process starting from a mixture of liquid crystal, monomer and nanoparticles (typically silver or gold). After curing has been completed, the liquid crystal can be extracted to leave nanostructure comprised polymer regions within which nanoparticles are dispersed. Various grating structures, which are essentially different forms of photonic crystal, can be formed as illustrated in FIGS. 34-36.

Figure 34:
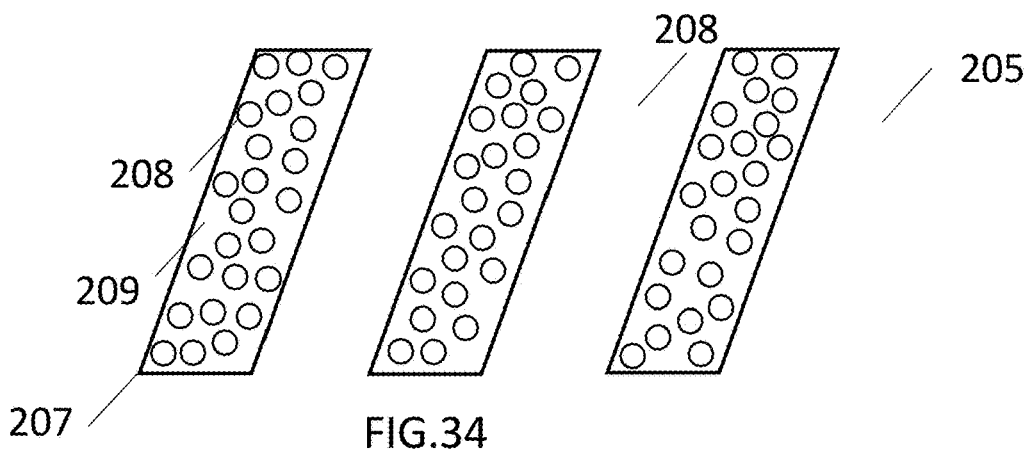
FIG. 34 illustrates a phased separated Bragg grating structure comprising polymer fringes immersed in air with each polymer fringe containing nanoparticles dispersed within a polymer matrix, in accordance with an embodiment of the invention.

FIG. 34 shows a simple phase-separated Bragg grating structure (205) comprising polymer fringes (207) immersed in air (208) with each fringe containing nanoparticles (208) dispersed within a polymer matrix (209). FIG. 35 shows a slice through a three-dimensional phase-separated photonic crystal or lattice (210) comprising polymer regions (211) immersed in air (212), with each polymer region containing nanoparticles (213) dispersed within a polymer matrix (214). FIG. 36 shows a phase-separated multiplexed grating structure (215) from first (216) and second (217) crossed Bragg gratings immersed in air (220), where each grating comprises fringes containing nanoparticles (218) dispersed within a polymer matrix (219). Many other nanostructure configurations can be provided based on the description and figures provided.

Figure 35:
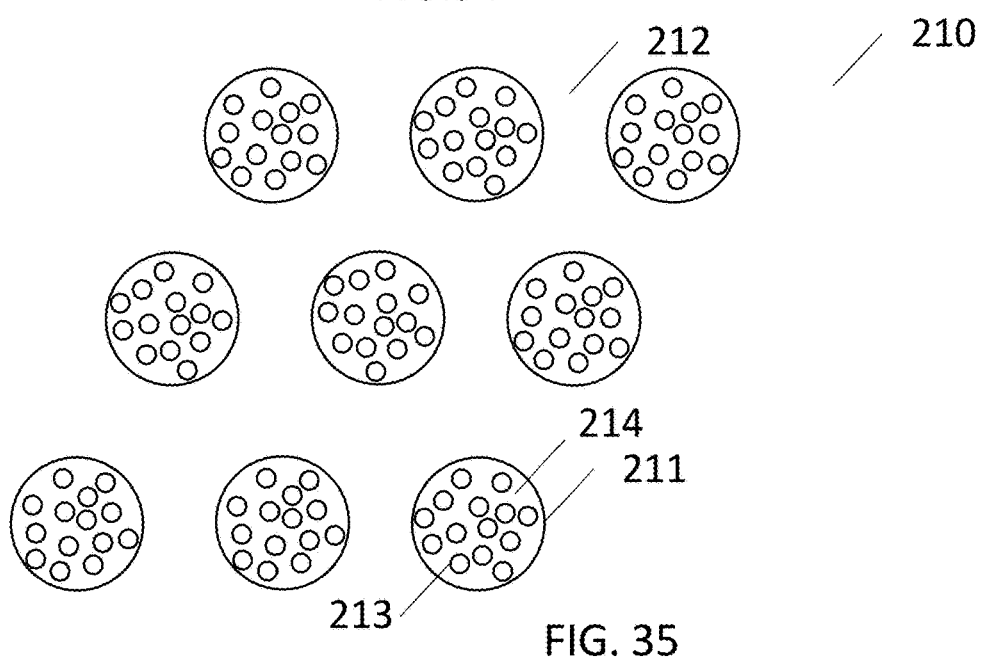
FIG. 35 illustrates a slice through a three-dimensional phase-separated photonic crystal or lattice comprises polymer regions immersed in air with each polymer region containing nanoparticles dispersed within a polymer matrix, in accordance with an embodiment of the invention.
Figure 36:
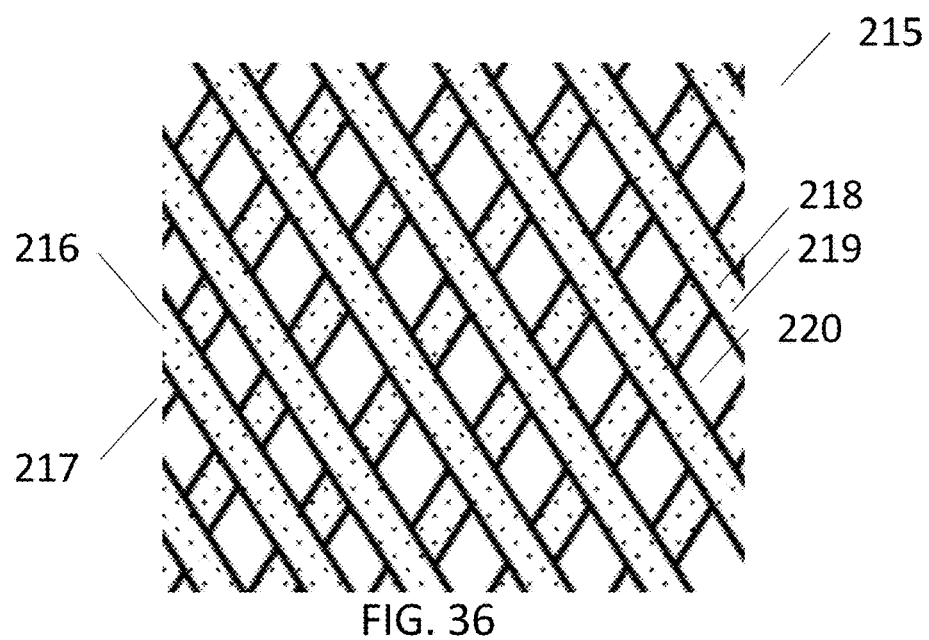
FIG. 36 illustrates a phase-separated multiplexed grating structure formed from crossed Bragg gratings immersed in air, where each grating comprises fringes containing nanoparticles dispersed within a polymer matrix, in accordance with an embodiment of the invention.
Figure 37:
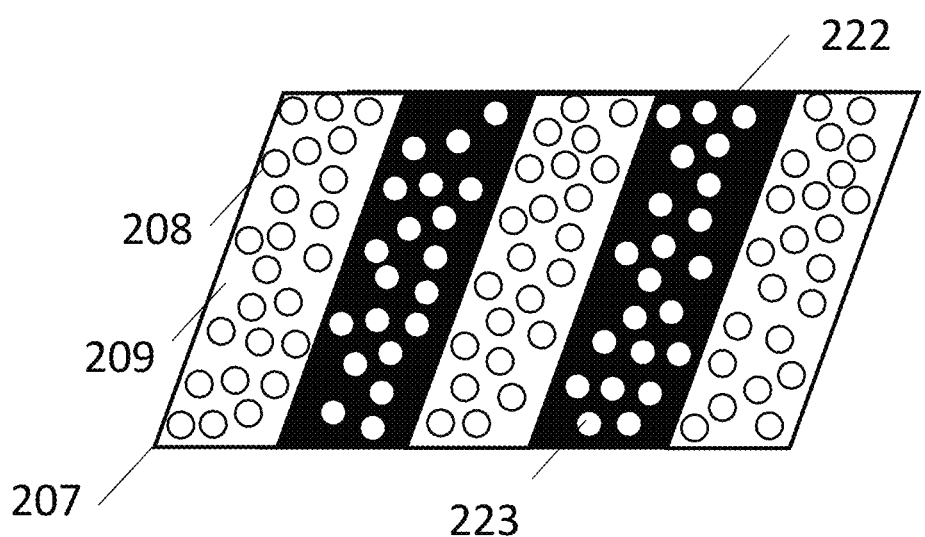
FIG. 37 illustrates a phase-separated diffractive structure in which the evacuated regions resulting from the evacuation of liquid crystal may contain a residual polymer network including gold or silver nanoparticles suspended in the polymer network, in accordance with an embodiment of the invention.

The diffractive structures illustrated in FIGS. 34-36 may have more complex morphologies than the ones illustrated. In some embodiments, the evacuated regions resulting from the evacuation of liquid crystal may contain a residual polymer network, including gold or silver nanoparticles suspended in the polymer network. FIG. 37 illustrates such a phase-separated diffractive structure based on the embodiment of FIG. 36. In the embodiment of FIG. 37, the evacuated regions now comprise the residual polymer network (222) containing dispersed nanoparticles (223). The concentration of polymer in the evacuated regions will typically be much lower than that of the polymer-rich regions. In some embodiments, the relative concentration of nanoparticles in the polymer-rich regions and the intervening regions may differ. In some embodiments, the nanoparticles may be uniformly dispersed in the film, while the polymer grating may be periodic. There are no restrictions on the type of polymer grating that can be formed. Any of the grating forms discussed above may be used in various embodiments based on the embodiments illustrated in FIGS. 34-36. In some embodiments, the grating prescription and concentration of nanoparticle concentration can have spatial variations that are not limited to uniform or periodic. In some embodiments of a biosensor for saliva testing, the analyte (saliva) may only penetrate the low concentration polymer and nanoparticle regions. Such embodiments offer the dual benefits of a diffractive structure that can be configured for various purposes, such as routing of light, light concentration etc., and a uniform dispersion of nanoparticles that act as surface plasmon resonance surfaces for amplifying the Raman scatter from the analyte. In some embodiments, the nanoparticles may incorporate reporter molecules as discussed above. The nanoparticles are not limited to any particular size or shape. In some embodiments, the nanoparticles may comprise particles of more than one different size or shape.

In some embodiments, it may be advantageous to form nanostructures of the type disclosed from polymers. However, it is known that some polymers can exhibit fluorescence under exposure to visible light. The fluorescence can reduce signal to noise ratio in Raman spectroscopy. The effect can be reduced by using high functionality monomers in the fabrication of the grating. In some embodiments, the biosensor will use pump lasers emitting in the blue region. However, in some embodiments gratings can be fabricated using high functionality monomer material systems designed for broader range of visible wavelengths or for infrared wavelengths.

The foregoing embodiments and advantages are merely exemplary, and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. Various changes may be made without departing from the spirit and scope of the invention, as defined in the following claims.

What is claimed is:

1. A molecular sensor, comprising:
   a pump laser source that emits pump light having at least one wavelength;
   a surface enhanced Raman spectroscopy (SERS) substrate;
   at least one type of molecule disposed in proximity to said SERS substrate, each of said at least one type of molecule exhibiting a unique Raman spectrum under irradiation from said light at said at least one wavelength;
   a detector with a detection bandwidth covering a Raman spectrum of said molecule;
   a pump laser substrate comprising at least one pump laser channel for propagating pump laser beams;
   a pump beam switch for directing a portion of the pump light from said pump laser source into each of said pump laser channels sequentially;
   a coupling layer overlaying each of said at least one pump laser channel for directing the pump light portion propagating in each channel towards said SERS substrate; and
   a Raman signal detection substrate comprising at least one Raman signal detection channel supporting an optical structure for selectively coupling in and transmitting towards said detector a portion of a Raman spectrum emitted by said at least one type of molecule after excitation by said portion of the pump light.

2. The molecular sensor of claim 1, wherein said optical structure is formed on at least one optical surface of said Raman signal detection substrate.

3. The molecular sensor of claim 1, wherein the Raman signal detection substrate comprises reflective optical surfaces formed on at least one of the upper and lower surfaces of said Raman signal substrate, and wherein the reflective optical surfaces include optical structures configured for directing said Raman signal along said Raman signal detection substrate towards the detector using at least one internal reflection.

4. The molecular sensor of claim 1, further comprising a Raman signal combiner for coupling each of said at least one Raman signal detection channel to said detector.

5. The molecular sensor of claim 1, further comprising a nanostructured substrate optically coupled to said SERS substrate, wherein said nanostructured substrate comprises at least one selected from the group of: a substrate supporting nanoparticles; a substrate supporting a nanostructure with a spatially varying nanostructure frequency; and a substrate supporting a nanostructure with a spatially varying nanostructure amplitude.

6. The molecular sensor of claim 1, wherein the portion of said coupling layer overlaying each said pump laser channel has a prescription for satisfying a Raman scattering momentum balance in a SERS surface plasmon region for one type of molecule.

7. The molecular sensor of claim 1, wherein at least a portion of said Raman signal detection substrate has optical power.

8. The molecular sensor of claim 1, wherein said coupling layer comprises nanostructures configured to provide surface plasmon characteristics for stimulating and amplifying Raman scattering from said at least one molecule.

9. The molecular sensor of claim 1, wherein: (1) said coupling layer and said Raman signal detection substrate are combined in a common substrate; (2) said common substrate includes a diffracting structure configured for directing the pump light portion propagating in each channel towards said SERS substrate; (3) said common substrate includes an optical structure formed on at least one optical surface of said common substrate for selectively coupling in a portion of a Raman spectrum emitted by said at least one type of molecule after excitation by said portion of the pump light; and (4) said common substrate further comprises reflective optical surfaces formed on at least one of the upper and lower surfaces of said common substrate, and the reflective optical surfaces include optical structures configured for directing said Raman signal along said common substrate towards said detector using at least one internal reflection.

10. The molecular sensor of claim 9, wherein said nanostructure substrate and said optical structures are aligned in orthogonal directions.

11. The molecular sensor of claim 1, wherein said pump beam switch comprises at least one switching grating.

12. The molecular sensor of claim 9, wherein said nanostructure substrate is configured for optimizing surface plasmons within regions of said SERS substrate in proximity to said at least one type of molecule.

13. The molecular sensor of claim 1, wherein said SERS substrate incorporates at least one selected from the group of: a reporter molecule; nanostructures structures formed using a phase separation process; metallized nanostructures structures; and more than one type of diffracting structure.

14. The molecular sensor of claim 1, wherein an output signal from said detector is coupled to a smartphone for processing and display of Raman spectra.

15. The molecular sensor of claim 1, configured as compact Raman spectrometer.

16. The molecular sensor of claim 1, further comprising nanostructures for providing reconfigurable diffractive antennas for at least one selected from the group of: wireless communications; long wavelength electromagnetic radiation collection; and detector coupling.

17. The molecular sensor of claim 1, configured for detecting COVID-19 from saliva using at least one of multivariate analysis of selected Raman spectrum lines or measurement of a Dublin-Boston score.

18. The molecular sensor of claim 1, further comprising grating structures operating in the millimeter wave band.

19. The molecular sensor of claim 1, further comprising a grating structure formed from a high functionality monomer and exhibiting a low fluorescence cross-section when irradiated by said pump light at said at least one wavelength.

20. The molecular sensor of claim 1, further comprising at least one selected from the group of: a liquid crystal layer disposed in proximity to the SERS substrate; at least one microfluidic component; magnetic components for manipulation of said at least one type of molecule; nanoparticles for manipulation of said at least one type of molecule; and a pump laser source emitting blue light.

* * * * *